United States Patent
Araki

(10) Patent No.: US 7,306,884 B2
(45) Date of Patent: Dec. 11, 2007

(54) DYE-CONTAINING CURABLE COMPOSITION, COLOR FILTER PREPARED USING THE SAME, AND PROCESS OF PREPARING COLOR FILTER

(75) Inventor: Katsumi Araki, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 96 days.

(21) Appl. No.: 11/350,012

(22) Filed: Feb. 9, 2006

(65) Prior Publication Data

US 2006/0194128 A1 Aug. 31, 2006

Related U.S. Application Data

(62) Division of application No. 10/400,079, filed on Mar. 27, 2003, now abandoned.

(30) Foreign Application Priority Data

| Mar. 28, 2002 | (JP) | ................................ 2002-91961 |
| Mar. 28, 2002 | (JP) | ................................ 2002-91962 |
| Mar. 28, 2002 | (JP) | ................................ 2002-91963 |
| Sep. 27, 2002 | (JP) | ................................ 2002-284137 |
| Sep. 27, 2002 | (JP) | ................................ 2002-284159 |
| Sep. 27, 2002 | (JP) | ................................ 2002-284160 |

(51) Int. Cl.
*G02B 5/20* (2006.01)

(52) U.S. Cl. ........................................ 430/7; 430/270.1

(58) Field of Classification Search ...................... None
See application file for complete search history.

(56) References Cited

U.S. PATENT DOCUMENTS 6,509,125 B1 * 1/2003 Ito et al. ........................ 430/7

FOREIGN PATENT DOCUMENTS

| JP | 59-30509 A | 2/1984 |
| JP | 2-199403 A | 8/1990 |
| JP | 4-76062 A | 3/1992 |
| JP | 5-333207 A | 12/1993 |
| JP | 6-75375 A | 3/1994 |
| JP | 6-194828 A | 7/1994 |
| JP | 8-179120 A | 7/1996 |
| JP | 2000-352610 A | * 12/2000 |

* cited by examiner

*Primary Examiner*—John A. McPherson
(74) *Attorney, Agent, or Firm*—Sughrue Mion Pllc.

(57) ABSTRACT

A dye-containing curable composition including an alkali-soluble binder and an organic-solvent-soluble dye represented by the following formula (I):

$$\text{Dye} \cdot n X \quad (I)$$

wherein Dye represents an acid dye; X represents an amine compound having an OH group and having a molecular weight of less than 230, an amine compound having an oxygen atom that forms an ether bond and having a molecular weight of 300 or less, or an amine compound having a polymerizable group; and n satisfies $0 < n \leq 10$.

4 Claims, No Drawings

DYE-CONTAINING CURABLE COMPOSITION, COLOR FILTER PREPARED USING THE SAME, AND PROCESS OF PREPARING COLOR FILTER

CROSS REFERENCE TO RELATED APPLICATIONS

This is a divisional of application Ser. No. 10/400,079 filed Mar. 27, 2003, now abandoned the disclosure of which is hereby incorporated by reference.

BACKGROUND OF THE INVENTION

1. Field of the Invention

The present invention relates to a dye-containing curable composition that is suitable for forming a colored image in a color filter used in liquid crystal displays or solid-state image elements, as well as to a color filter prepared using the composition, and to a process of preparing the color filter.

2. Description of the Related Art

As a method of preparing a color filter for use in liquid crystal displays or solid-state image elements, a dyeing process, a printing process, an electrodepositing process and a pigment dispersing process are known.

The dyeing process comprises dyeing a substrate, that is made of a natural resin (e.g., gelatin, glue and casein) or a synthetic resin (e.g., amine-modified polyvinyl alcohol), with a dye such as an acid dye, to thereby prepare a color filter.

The dyeing process involves problems with respect to lightfastness, heat resistance and humidity resistance due to using the dye, a problem in that color unevenness occurs when producing large size screens because it is difficult to uniformly control dyeing and fixing characteristics, and a problem in that a procedure is complicated since an antidyeing layer is needed when conducting the dyeing.

The electrodepositing process comprises forming transparent electrodes in a prescribed pattern beforehand, ionizing a resin that contains a pigment dissolved or dispersed in a solvent, and applying a voltage to form a colored image in accordance with a pattern shape, to thereby prepare a color filter.

This electrodepositing process requires a photolithographic step including film-forming and etching steps for producing transparent electrodes for forming a color filter in addition to transparent electrodes for display. During this process, if a short circuit occurs, line defects are generated leading to a reduction in yield. In principle, this process is difficult to apply to alignments other than a stripe alignment, such as a mosaic alignment. Moreover, this process has a problem in that control of the transparent electrodes is difficult.

The printing process is a simple and easy process for preparing a color filter, in which an ink that contains a thermosetting resin or a ultraviolet-curing resin and a pigment dispersed therein is used for printing, such as offset printing. However, because of a high viscosity of the ink used in this process, filtering is difficult, and defects resulting from contaminants, foreign matter or gelling of an ink binder are easily generated. Further, this process involves problems with respect to position precision, line width precision, and plane smoothness depending on printing precision.

The pigment dispersing process is a process employed for preparing a color filter, through a photographic technique using a colored radioactive composition containing a pigment dispersed in various photosensitive compositions. Since this process uses pigments, it is stable against light and heat. Further, since patterning is carried out by the photolithographic technique, the pigment dispersing process is suitable for the preparation of a color filter that achieves a sufficient position precision and is suitable for use in large-size screens and high resolution color displays.

In order to prepare a color filter by the pigment dispersing process, a radioactive composition is applied on a glass substrate using a spin coater, a roll coater or the like, followed by drying to form a coated film, which is then subjected to pattern exposure and development to thereby form colored pixels. This procedure is carried out for respective colors to obtain the color filter.

For use in the pigment dispersing process, negative-type photosensitive compositions have been disclosed which comprise a photopolymerizable monomer, a photopolymerization initiator and an alkali-soluble resin (see, for example, Japanese Patent Application Laid-Open (JP-A) Nos. 1-102469, 1-152499, 2-181704, 2-199403, 4-76062, 5-273411, 6-184482 and 7-140654).

However, in recent years, a still higher resolution is being demanded for color filters used in solid-state image elements. But, by employing the conventional pigment dispersing system, resolution cannot be enhanced, and color unevenness occurs due to coarse particles of the pigment. Accordingly, the pigment dispersing process is not suitable for the applications that require fine patterns, such as for use in solid-state image elements. In order to solve this problem, use of a dye has been proposed (see, for example, JP-A No. 6-75375).

Dye-containing curable compositions involve the following newly raised problems (1) to (4):

(1) Since conventional dyes are low in solubility in an alkaline aqueous solution or an organic solvent, it is difficult to obtain a liquid curable composition having a desired spectrum.

(2) Since dyes often interact with other components in a curable composition, it is difficult to regulate solubility (developability) at cured portions and non-cured portions.

(3) In a case where a molar absorptive coefficient (F) of a dye is low, addition of a large amount of the dye is required. For this reason, an amount of other components in the curable composition, such as polymerizable compounds (monomers), binders and photopolymerization initiators must be reduced, thereby raising other problems such as lowered curability and reduced heat resistance of the composition after curing, and impaired developability at cured portions and non-cured portions.

(4) Generally, dyes are inferior to pigments in lightfastness and heat resistance.

Owing to the aforementioned problems, it has been difficult to achieve a fine colored pattern for high resolution thin color filters.

Further, in contrast to when applied for preparation of semi-conductors, when applied for preparing color filters for solid-state image elements, the composition is required to have a film thickness of 1 μm or less. Accordingly, in order to exhibit a desired absorption, a large amount of the dye must be added to the curable composition, which results in occurrence of the foregoing problems.

On the other hand, there are known dyes that contain salts with various amines having enhanced solubility with respect to acid dyes. Examples thereof include amine salts of "Acid Yellow 42" having solubility in alkaline aqueous solutions or organic solvents (e.g., ditolylguanidine salts). However, since these amine salts do not have an OH group in their imine moiety, interaction with other components present in a resist considerably lowers their alkaline developability. Further, since an azo-based acid dye represented by "Acid Yellow 42" can take various conformations, a molar absorptive coefficient thereof may occasionally be lowered. Accordingly, when these amine salts have counter ions having a high molecular weight, a color value (absorbance/weight) decreases, and hence a large amount of the dye must still be added to the resist composition. For this reason, problems similar to those described above arise, and therefore, improvements have been demanded (see, for example, JP-A No. 59-30509).

SUMMARY OF THE INVENTION

An object of the present invention is to provide a dye-containing curable composition that exhibits high sensitivity, high transmittance, high resolving power and wide development latitude, is free from dye elution, deterioration by heat and deterioration by light, and has high productivity, as well as a color filter prepared using the dye-containing curable composition, and a process of preparing the color filter.

According to the invention, a dye-containing curable composition that has the following constitution and is suitably applied to preparation of color filters, and a process of preparing a color filter are provided.

A first aspect of the invention is a dye-containing curable composition comprising an alkali-soluble binder and an organic-solvent-soluble dye represented by the following formula (I):

Dye·nX (I)

wherein Dye represents an acid dye; X represents an amine compound having an OH group and having a molecular weight of less than 230; and n satisfies $0 < n \leq 10$.

In the dye-containing curable composition according to the first aspect of the invention, it is preferable that the amine compound represented by X in formula (I) has from 1 to 6OH groups per molecular weight of 100. The amine compound has, per molecular weight thereof of 100, preferably from 1 to 5OH groups, more preferably from 1 to 4OH groups, and most preferably from 1 to 3OH groups.

In the dye-containing curable composition according to the first aspect of the invention, it is preferable that the amine compound represented by X in formula (I) has up to 14 carbon atoms. The amine compound has preferably up to 12 carbon atoms, more preferably up to 10 carbon atoms, and most preferably up to 8 carbon atoms.

In the dye-containing curable composition according to the first aspect of the invention, it is preferable that the amine compound represented by X in formula (I) is a secondary or tertiary amine compound, with a tertiary amine compound being more preferable.

In the dye-containing curable composition according to the first aspect of the invention, it is preferable that the amine compound represented by X in formula (I) has linear aliphatic or cyclic aliphatic carbons, with the linear aliphatic carbons being more preferable.

In the dye-containing curable composition according to the first aspect of the invention, it is preferable that the amine compound represented by X in formula (I) has a surface energy of 10 to 80 dyn/cm, more preferably 15 to 70 dyn/cm, and most preferably 20 to 60 dyn/cm.

A second aspect of the invention is a dye-containing curable composition comprising an alkali-soluble binder and an organic-solvent-soluble dye represented by the following formula (I):

Dye·nX (I)

wherein Dye represents an acid dye; X represents an amine compound having an oxygen atom that forms an ether bond and having a molecular weight of 300 or less; and n satisfies $0 < n \leq 10$.

In the dye-containing curable composition according to the second aspect of the invention, it is preferable that the amine compound represented by X in formula (I) has from 1 to 6 ether groups per molecular weight of 100. The amine compound has, per molecular weight thereof of 100, preferably from 1 to 5 ether groups, more preferably 1 to 4 ether groups, and most preferably 1 to 3 ether groups.

In the dye-containing curable composition according to the second aspect of the invention, it is preferable that the amine compound represented by X in formula (I) has up to 14 carbon atoms. The amine compound has preferably up to 12 carbon atoms, more preferably up to 10 carbon atoms, and most preferably up to 8 carbon atoms.

In the dye-containing curable composition according to the second aspect of the invention, it is preferable that the amine compound represented by X in formula (I) is a secondary or tertiary amine compound, with a tertiary amine compound being more preferable.

In the dye-containing curable composition according to the second aspect of the invention, it is preferable that the amine compound represented by X in formula (I) has linear aliphatic or cyclic aliphatic carbons, with the linear aliphatic carbons being more preferable.

In the dye-containing curable composition according to the second aspect of the invention, it is preferable that the amine compound represented by X in formula (I) has a surface energy of 10 to 80 dyn/cm, more preferably 15 to 70 dyn/cm, and most preferably 20 to 60 dyn/cm.

A third aspect of the invention is a dye-containing curable composition comprising an alkali-soluble binder and an organic-solvent-soluble dye represented by the following formula (I):

Dye·nX (I)

wherein Dye represents an acid dye; X represents an amine compound having a polymerizable group; and n satisfies $0 < n \leq 10$.

A fourth aspect of the invention is a color filter comprising a dye-containing curable composition according to any one of the first aspect, the second aspect and the third aspect.

A fifth aspect of the invention is a process of preparing a color filter, which comprises the steps of applying on a substrate the dye-containing curable composition according to any one of the first aspect, the second aspect and the third aspect, exposing the composition to light through a mask, and conducting development to form a pattern. This preparation process may comprise an additional step of curing the pattern by heating and/or exposing to light, as necessary, and the above-described steps may be repeated plural times.

DESCRIPTION OF THE PREFERRED EMBODIMENTS

A dye-containing curable composition, a color filter prepared using the composition, and a process of preparing the color filter according to the present invention will be described in detail below.

<<Dye-Containing Curable Composition>>

The dye-containing curable composition of the invention (hereinafter sometimes referred to as "composition of the invention") is a dye-containing curable composition comprising an alkali-soluble binder and an organic-solvent-soluble dye, and the organic-solvent-soluble dye is a compound represented by the following formula (I).

In the dye-containing curable composition according to the first aspect of the invention, in formula (I), Dye represents an acid dye; X represents an amine compound having an OH group and having a molecular weight of less than 230; and n satisfies $0 < n \leqq 10$.

In the dye-containing curable composition according to the second aspect of the invention, in formula (I), Dye represents an acid dye; X represents an amine compound having an oxygen atom that forms an ether bond and having a molecular weight of 300 or less; and n satisfies $0 < n \leqq 10$.

In the dye-containing curable composition according to the third aspect of the invention, in formula (I), Dye represents an acid dye; X represents an amine compound having a polymerizable group; and n satisfies $0 < n \leqq 10$.

In the dye-containing curable composition according to the third aspect of the invention, in formula (I), the amine compound represented by X preferably has a molecular weight of 700 or less, more preferably 600 or less, further preferably 500 or less, and most preferably 400 or less.

In the dye-containing curable composition according to the third aspect of the invention, in formula (I), the polymerizable group in the amine compound represented by X is preferably at least one member selected from a (meth)acrylic ester group, a (meth)acrylamide group, an allyl group, an isopropenyl group, a vinyl ether group, an epoxy group, a stylyl group, and a vinyl ester group.

Among these polymerizable groups, a (meth)acrylic ester group, a (meth)acrylamide group, an allyl group, an isopropenyl group, a vinyl ether group, an epoxy group, and a stylyl group are more preferable; a (meth)acrylic ester group, a (meth)acrylamide group, an allyl group, an isopropenyl group, a vinyl ether group, and an epoxy group are more preferable; and a (meth)acrylic ester group, a (meth)acrylamide group, an allyl group, an isopropenyl group, a vinyl ether group, and a glycidyl group are most preferable.

In the dye-containing curable composition according to the third aspect of the invention, in formula (I), the amine compound represented by X preferably contains 15 or less polymerizable groups, more preferably 12 or less polymerizable groups, still more preferably 8 or less polymerizable groups, and most preferably 6 or less polymerizable groups.

In order to increase the curability of the film, the composition of the invention may contain a crosslinking agent. Further, in the case where the composition of the invention is a negative-type composition, the composition may include a monomer and a photopolymerization initiator in addition to the aforementioned alkali-soluble binder and organic-solvent-soluble dye, and may further include a crosslinking agent.

(Organic-Solvent-Soluble Dye)

The organic-solvent-soluble dye for use in the invention is a compound comprising a salt of an acid dye and an amine compound, as represented by the above formula (I).

Acid Dye

The acid dye will be described below. The acid dye is not particularly limited insofar as it is a dye having an acid group such as a sulfonic acid group, a carboxylic acid group and a phenolic hydroxyl group. The dye is selected considering all of preferential orders of required performances, such as solubility in the organic solvent or developing solution, ability to form a salt with a basic compound, absorbance, interaction with other components in the curable composition, lightfastness, and heat resistance.

Specific examples of the acid dye will be given below, but it should not be construed to limit the invention. Illustrative examples thereof include Acid Alizarin Violet N; Acid Black 1, 2, 24, 48; Acid Blue 1, 7, 9, 15, 18, 23, 25, 27, 29, 40, 42, 45, 51, 62, 70, 74, 80, 83, 86, 87, 90, 92, 96, 103, 112, 113, 120, 129, 138, 147, 150, 158, 171, 182, 192, 210, 242, 243, 256, 259, 267, 278, 280, 285, 290, 296, 315, 324:1, 335, 340; Acid Chrome Violet K; Acid Fuchsin; Acid Green 1, 3, 5, 9, 16, 25, 27, 50, 58, 63, 65, 80, 104, 105, 106, 109; Acid Orange 6, 7, 8, 10, 12, 26, 50, 51, 52, 56, 62, 63, 64, 74, 75, 94, 95, 107, 108, 169, 173; Acid Red 1, 4, 8, 14, 17, 18, 26, 27, 29, 31, 34, 35, 37, 42, 44, 50, 51, 52, 57, 66, 73, 80, 87, 88, 91, 92, 94, 97, 103, 111, 114, 129, 133, 134, 138, 143, 145, 150, 151, 158, 176, 182, 183, 195, 198, 206, 211, 215, 216, 217, 227, 228, 249, 252, 257, 258, 260, 261, 266, 268, 270, 274, 277, 280, 281, 308, 312, 315, 316, 339, 341, 345, 346, 349, 382, 383, 394, 401, 412, 417, 418, 422, 426; Acid Violet 6B, 7, 9, 17, 19; Acid Yellow 1, 3, 7, 9, 11, 17, 23, 25, 29, 34, 36, 38, 40, 42, 54, 65, 72, 73, 76, 79, 98, 99, 111, 112, 113, 114, 116, 119, 123, 128, 134, 135, 138, 139, 140, 144, 150, 155, 157, 160, 161, 163, 168, 169, 172, 177, 178, 179, 184, 190, 193, 196, 197, 199, 202, 203, 204, 205, 207, 212, 214, 220, 221, 228, 230, 232, 235, 238, 240, 242, 243, 251; Direct Yellow 2, 33, 34, 35, 38, 39, 43, 47, 50, 54, 58, 68, 69, 70, 71, 86, 93, 94, 95, 98, 102, 108, 109, 129, 136, 138, 141; Direct Orange 34, 39, 41, 46, 50, 52, 56, 57, 61, 64, 65, 68, 70, 96, 97, 106, 107; Direct Red 79, 82, 83, 84, 91, 92, 96, 97, 98, 99, 105, 106, 107, 172, 173, 176, 177, 179, 181, 182, 184, 204, 207, 211, 213, 218, 220, 221, 222, 232, 233, 234, 241, 243, 246, 250; Direct Violet 47, 52, 54, 59, 60, 65, 66, 79, 80, 81, 82, 84, 89, 90, 93, 95, 96, 103, 104; Direct Blue 57, 77, 80, 81, 84, 85, 86, 90, 93, 94, 95, 97, 98, 99, 100, 101, 106, 107, 108, 109, 113, 114, 115, 117, 119, 137, 149, 150, 153, 155, 156, 158, 159, 160, 161, 162, 163, 164, 166, 167, 170, 171, 172, 173, 188, 189, 190, 192, 193, 194, 196, 198, 199, 200, 207, 209, 210, 212, 213, 214, 222, 228, 229, 237, 238, 242, 243, 244, 245, 247, 248, 250, 251, 252, 256, 257, 259, 260, 268, 274, 275, 293; Direct Green 25, 27, 31, 32, 34, 37, 63, 65, 66, 67, 68, 69, 72, 77, 79, 82; Mordant Yellow 3, 5, 8, 10, 16, 20, 26, 30, 31, 33, 42, 43, 45, 56, 50, 61, 62, 65; Mordant Orange 3, 4, 5, 8, 12, 13, 14, 20, 21, 23, 24, 28, 29, 32, 34, 35, 36, 37, 42, 43, 47, 48; Mordant Red 1, 2, 3, 4, 9, 11, 12, 14, 17, 18, 19, 22, 23, 24, 25, 26, 30, 32, 33, 36, 37, 38, 39, 41, 43, 45, 46, 48, 53, 56, 63, 71, 74, 85, 86, 88, 90, 94, 95; Mordant Violet 2, 4, 5, 7, 14, 22, 24, 30, 31, 32, 37, 40, 41, 44, 45, 47, 48, 53, 58; Mordant Blue 2, 3, 7, 8, 9, 12, 13, 15, 16, 19, 20, 21, 22, 23, 24, 26, 30, 31, 32, 39, 40, 41, 43, 44, 48, 49, 53, 61, 174, 77, 83, 84; Mordant Green 1, 3, 4, 5, 10, 15, 19, 26, 29, 33, 34, 35, 41, 43, 53; Food Yellow 3; and derivatives of these dyes.

Among these acid dyes, preferable are Acid Black 24; Acid Blue 23, 25, 29, 62, 80, 86, 87, 92, 138, 158, 182, 243, 324; Acid Orange 8, 51, 56, 63, 74; Acid Red 1, 4, 8, 34, 37, 42, 52, 57, 80, 97, 114, 143, 145, 151, 183, 217; Acid Violet 7; Acid Yellow 17, 25, 29, 34, 38, 42, 65, 72, 76, 99, 111, 112, 114, 116, 134, 155, 169, 172, 184, 220, 228, 230, 232, 243; Acid Green 25; Mordant Yellow 3; and derivatives of these dyes.

Also, other azo-based, xanthene-based and phthalocyanine-based acid dyes than those described above, such as C.I. Solvent Blue 44, 38; C.I. Solvent Orange 45; Rhodamine B; Rhodamine 110; 2,7-naphthalenedisulfonic acid; 3-[(5-chloro-2-phenoxyphenyl)hydrazino]-3,4-dihydro-4-oxo-5-[(phenylsulfonyl)amino]; and derivatives of these dyes, are preferable.

Examples of the acid dye derivative include inorganic salts of an acid dye having an acid group of a sulfonic acid, a carboxylic acid or the like, salts of an acid dye and a nitrogen-containing compound, and (sulfon)amide compounds of an acid dye. The acid dye derivatives are not particularly limited insofar as they may be dissolved as the curable composition solution, however, they are selected considering all of the required performances, such as solubility in the organic solvent or developing solution, absorbance, interaction with other components in the curable composition, lightfastness, and heat resistance.

In the invention, preferable acid dyes are azo-based, anthraquinone-based, anthrapyridone-based and phthalocyanine-based dyes. Particularly, a compound represented by the following general formula (II) may be preferably used as the azo-based acid dye.

$$A-N=N-B \qquad (II)$$

In the formula (II), A and B each independently represent an optionally substituted pyrazole ring, benzene ring, naphthalene ring or acetylacetone residue.

Representative examples of the compound represented by the general structure (II) include the following compounds.

example of the general structure II

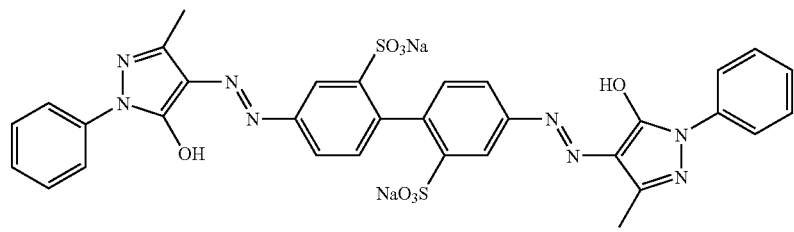

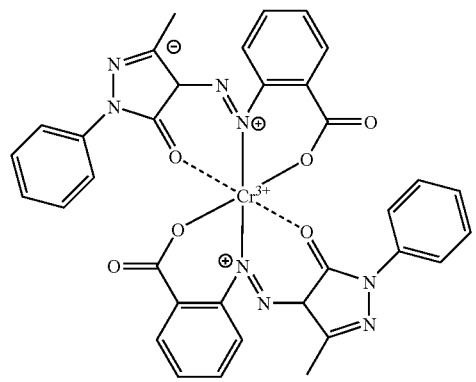

Mordant yellow 3

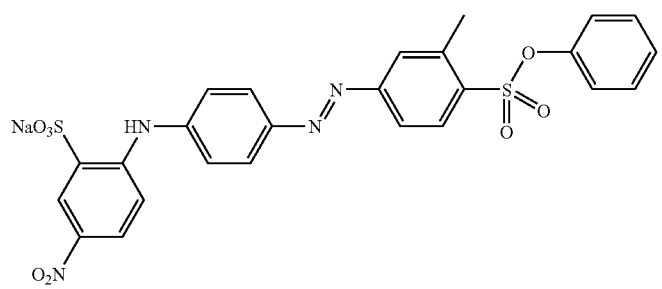

acid yellow 65

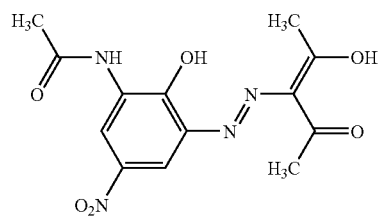

acid yellow 134

-continued
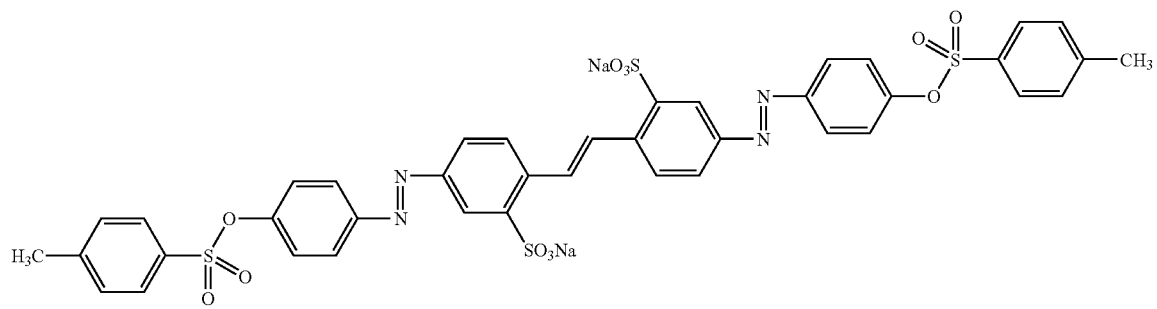
acid yellow 228
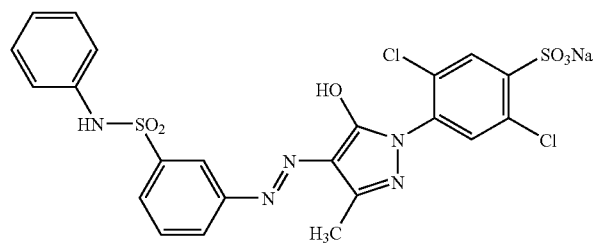
acid yellow 172
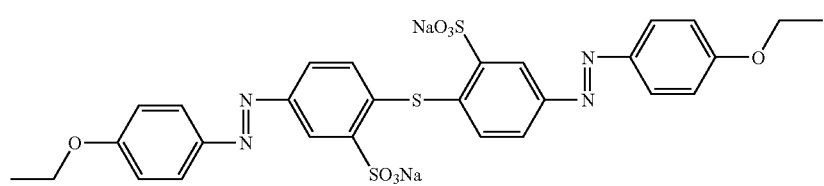
acid yellow 38
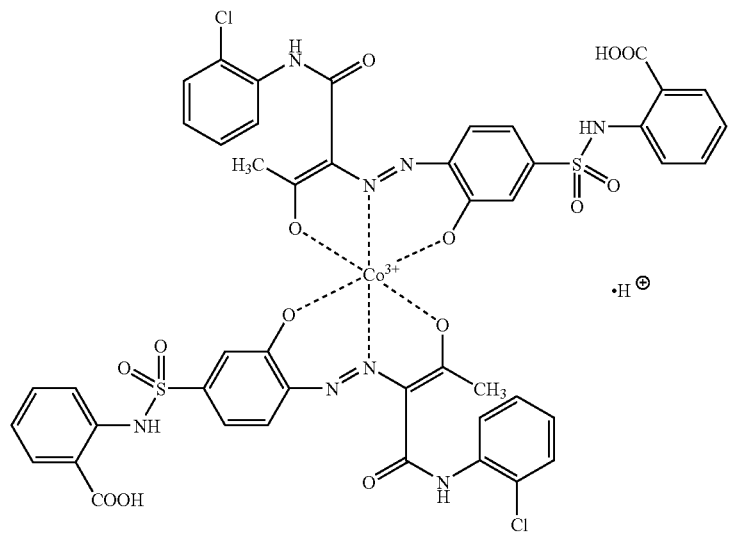
acid yellow 220
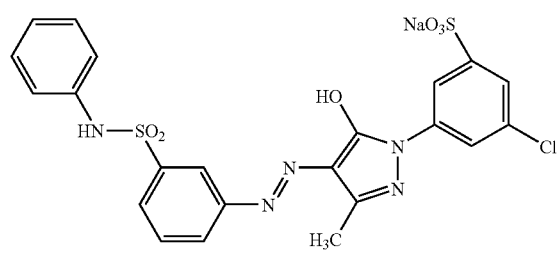
acid yellow 29

Amine Compound

The amine compound that forms a salt with the aforementioned acid dye will be described below.

(1) In the dye-containing curable composition according to the first aspect of the invention, in the formula (I), the amine compound represented by X has an OH group and has a molecular weight of less than 230. The amine compound is selected considering all of the required performances such as solubility in the organic solvent or developing solution, salt forming properties, absorbance of the dye, and interaction with other components in the curable composition. When the amine compound is selected considering the absorbance only, it is preferred that the molecular weight of the amine compound is as low as possible. In particular, the molecular weight of the amine compound is preferably 220 or less, more preferably 200 or less, and most preferably 180 or less.

Specific examples of the foregoing amine compound will be given below, but it should not be construed that the invention is limited thereto.

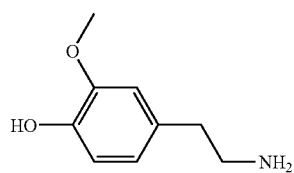

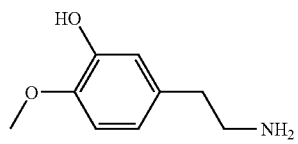

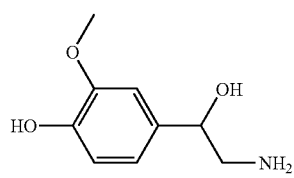

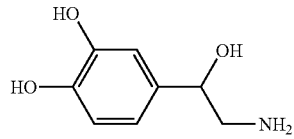

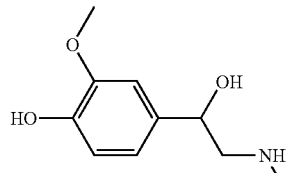

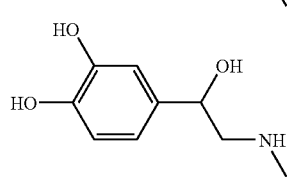

-continued

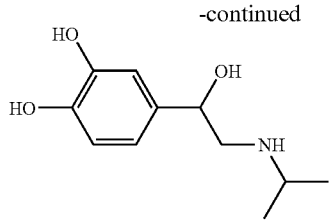

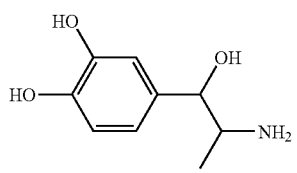

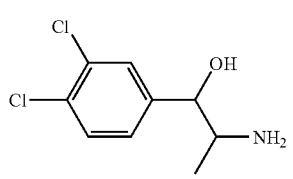

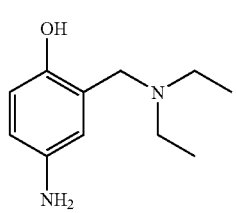

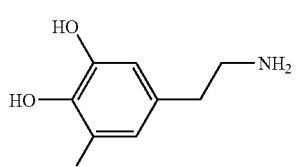

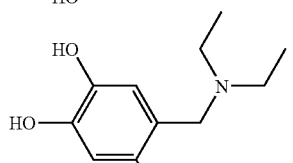

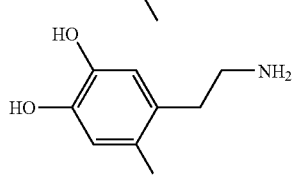

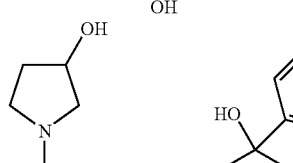

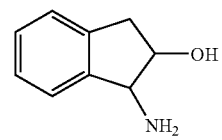

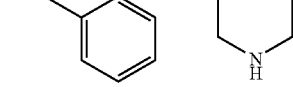

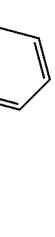

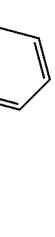

-continued
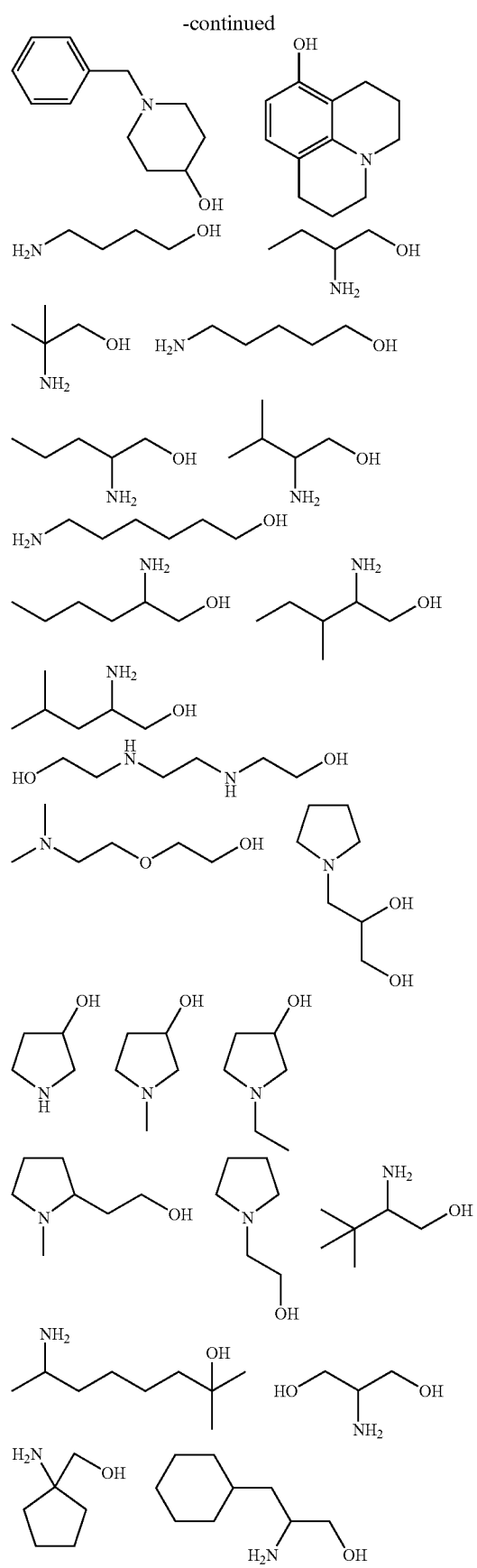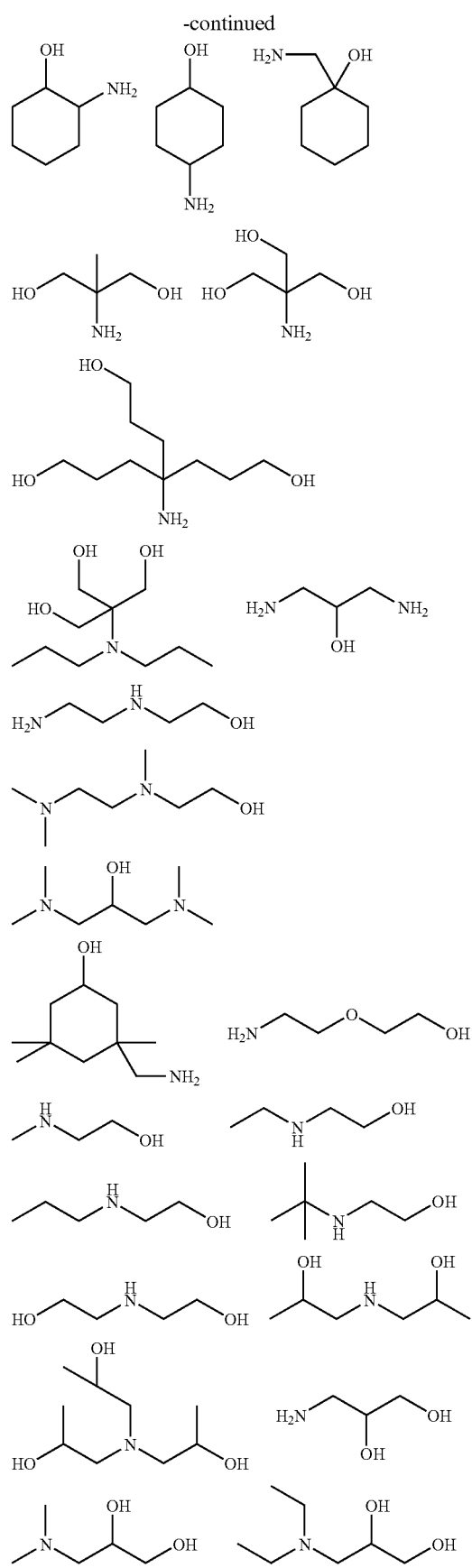

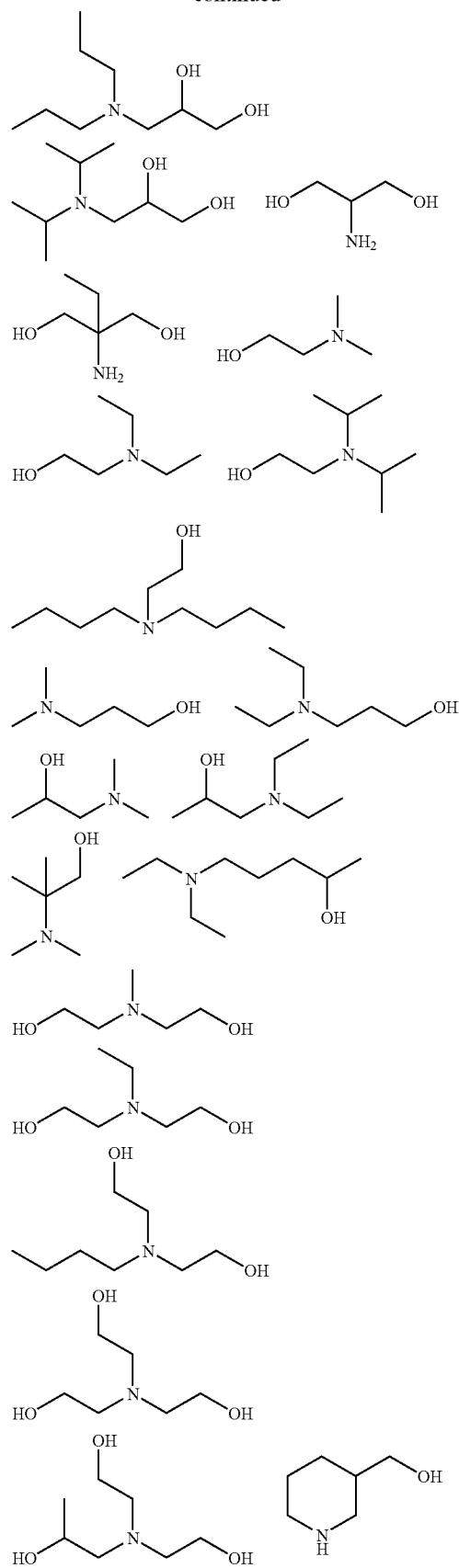
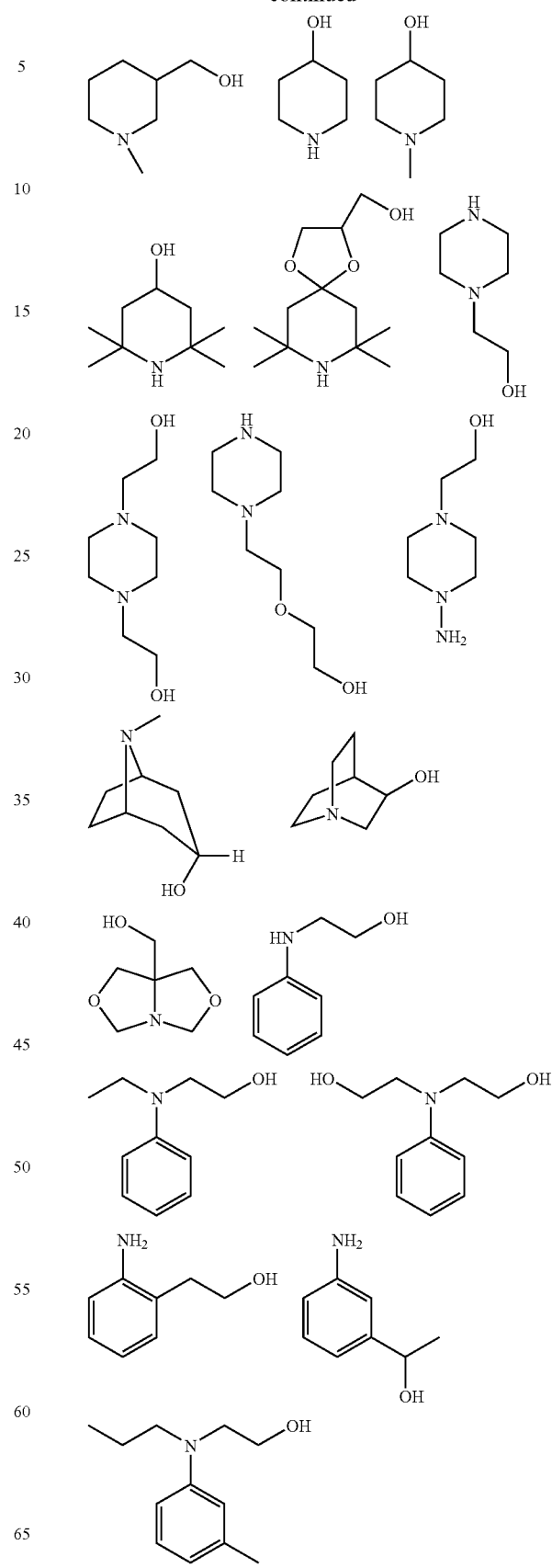

-continued
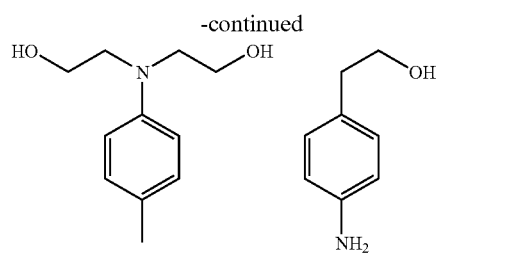
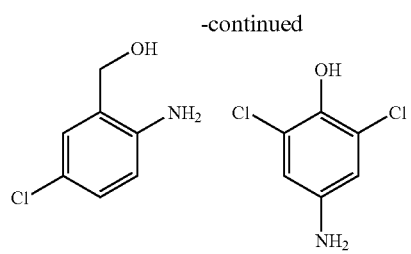
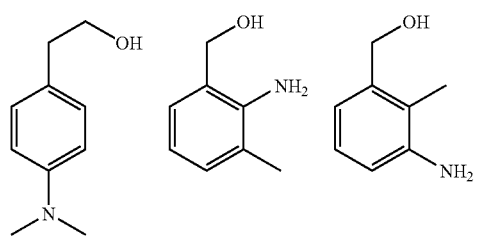
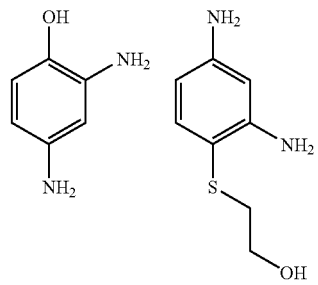
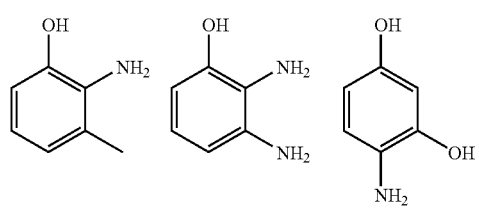
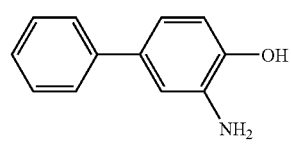
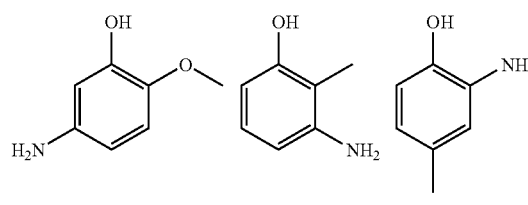
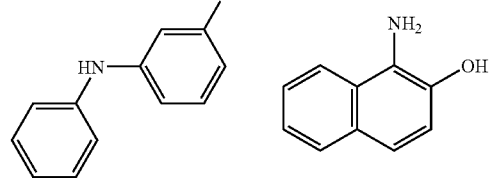
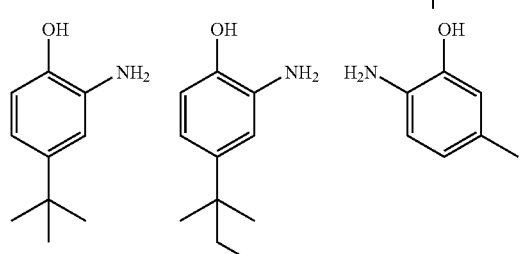
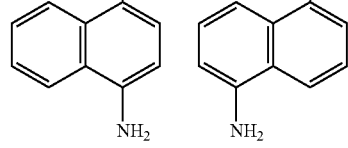
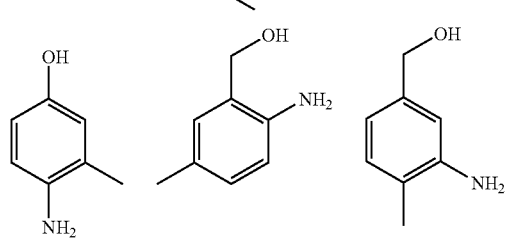
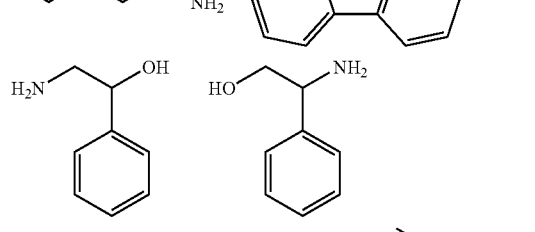
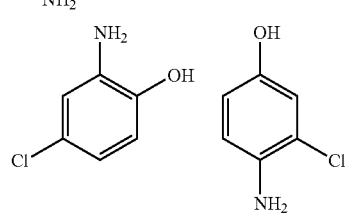
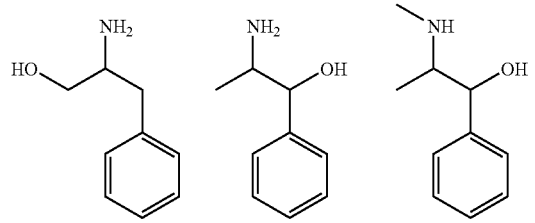

-continued
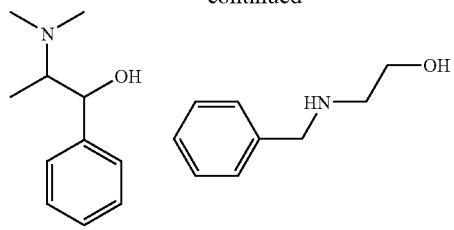
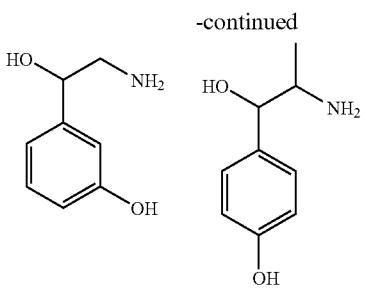
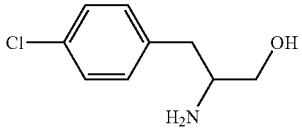
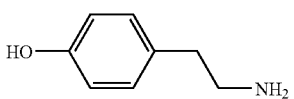
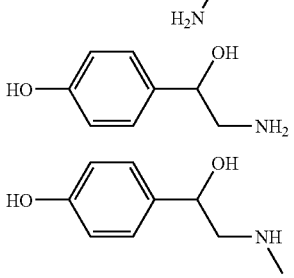
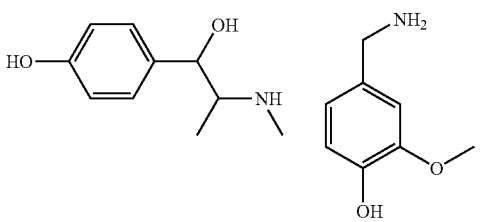
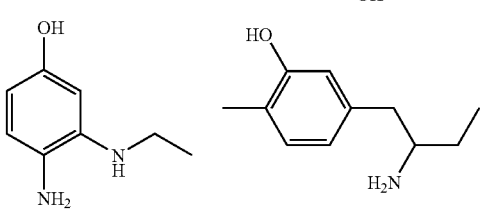
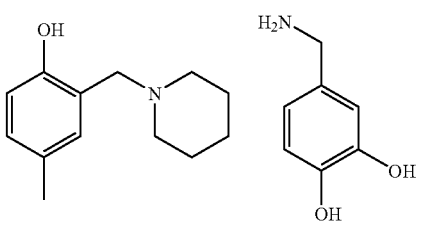

-continued

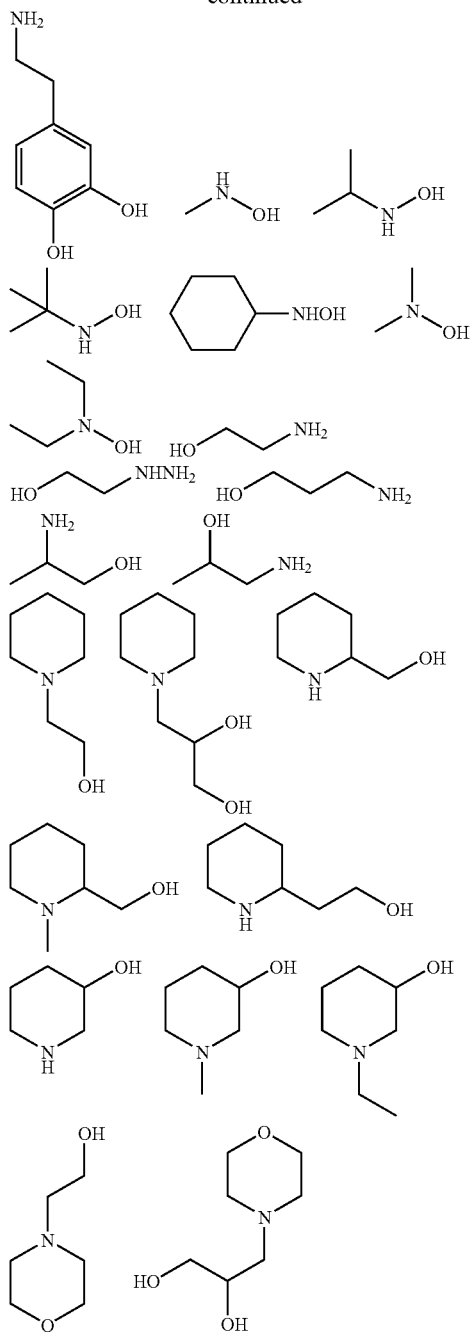

(2) In the dye-containing curable composition according to the second aspect of the invention, in the formula (I), the amine compound represented by X has an oxygen atom that forms an ether bond and has a molecular weight of 300 or less. The amine compound is selected considering all of the required performances such as solubility in the organic solvent or developing solution, salt forming properties, absorbance of the dye, and interaction with other components in the curable composition. When the amine compound is selected considering the absorbance only, it is preferred that the molecular weight of the amine compound is as low as possible. In particular, the molecular weight of the amine compound is preferably 250 or less, more preferably 230 or less, and most preferably 200 or less.

Specific examples of the foregoing amine compound will be given below, but it should not be construed that the invention is limited thereto.

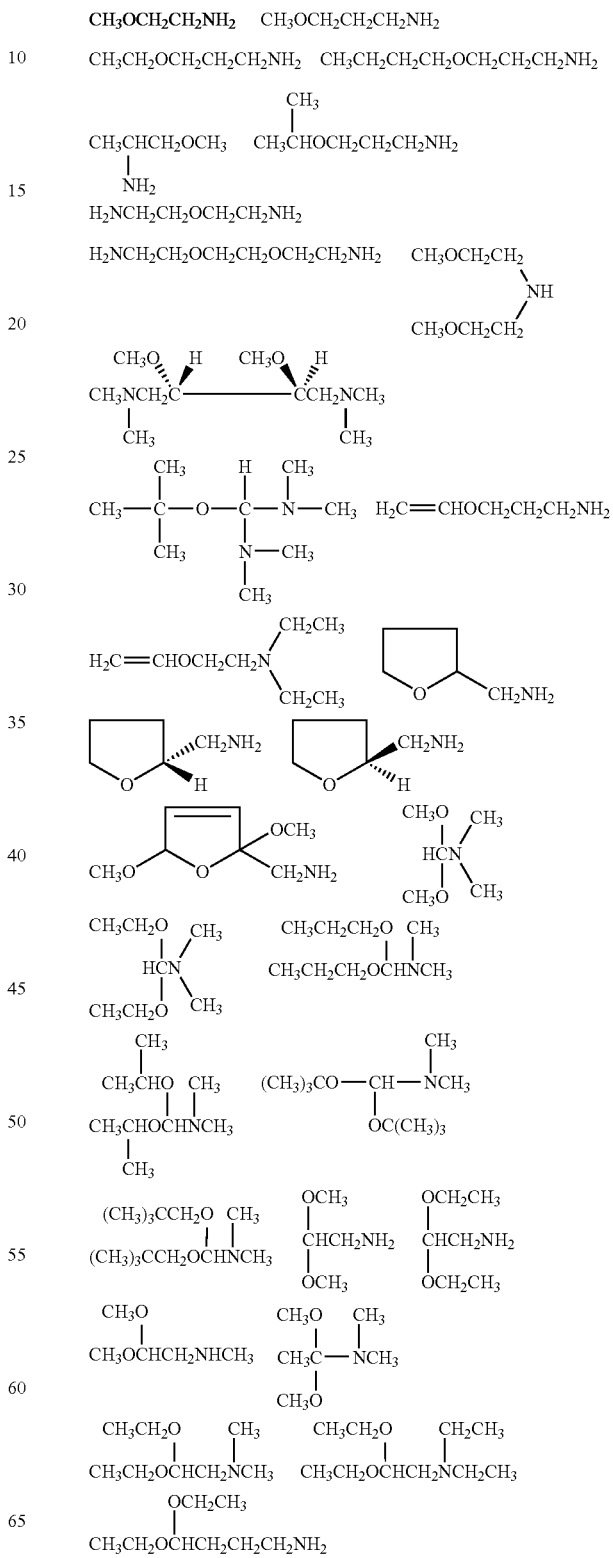

-continued
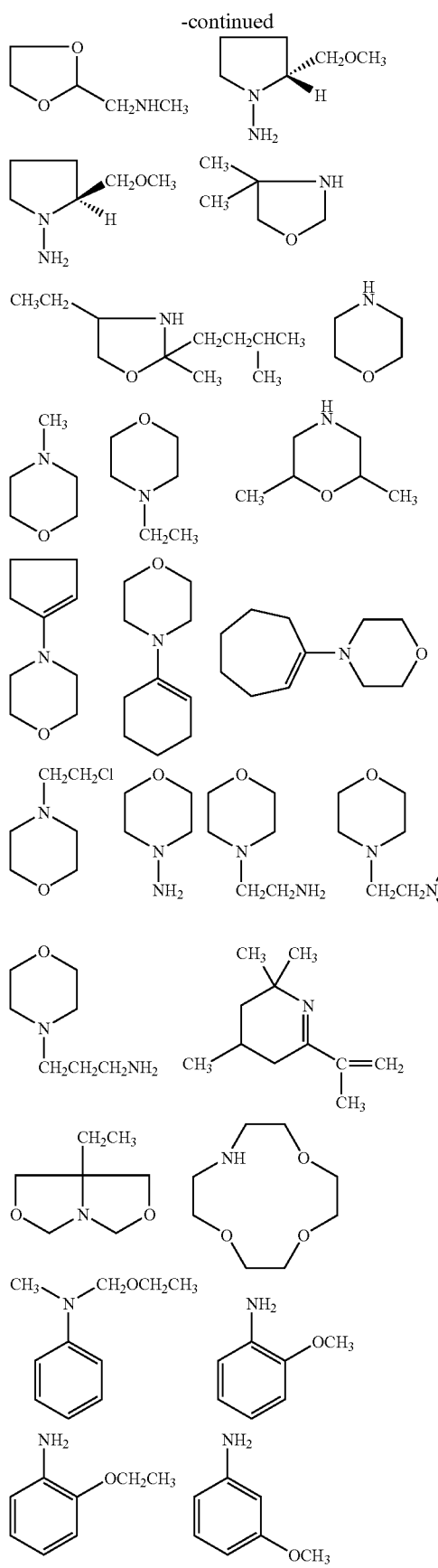
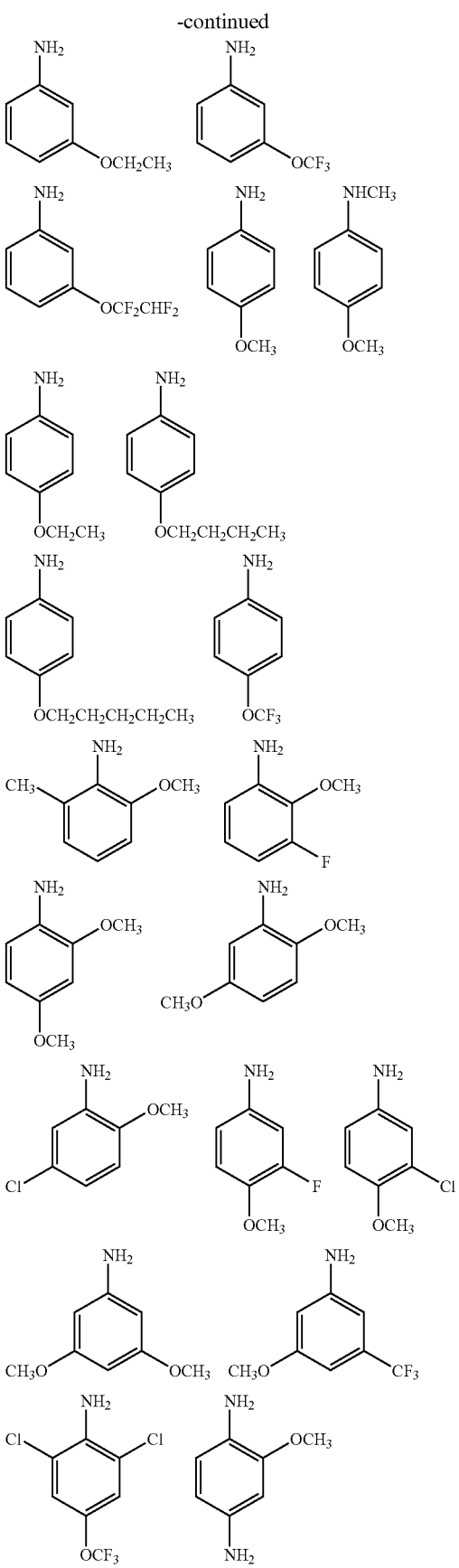

-continued

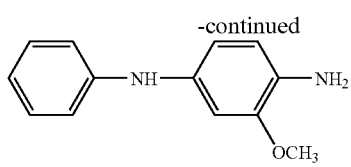
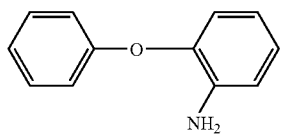
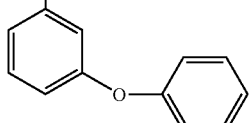
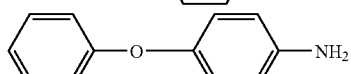
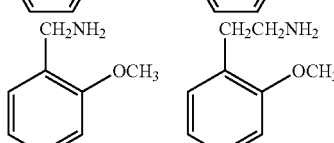
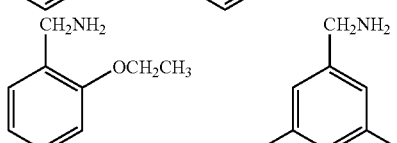
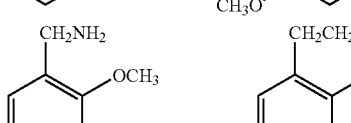
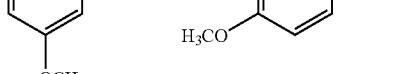
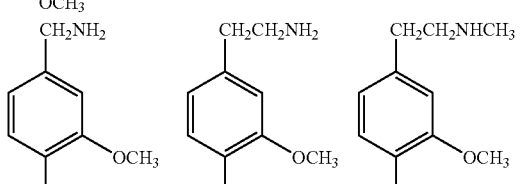
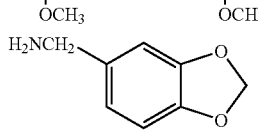
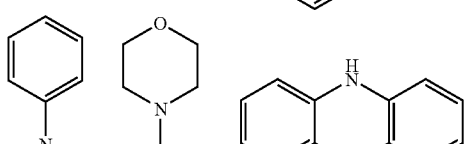
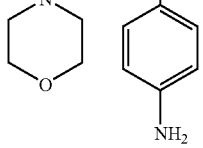

(3) In the dye-containing curable composition according to the third aspect of the invention, in the formula (I), the amine compound represented by X has a polymerizable group. The amine compound is selected considering all of the required performances such as solubility in the organic solvent or developing solution, salt forming properties, absorbance of the dye and interaction with other components in the curable composition. When the amine compound is selected considering the absorbance only, it is preferred that the molecular weight of the amine compound is as low as possible. In particular, the molecular weight of the amine compound is preferably 700 or less, more preferably 600 or less, further preferably 500 or less, and most preferably 400 or less.

Examples of the polymerizable group, which the above-described amine compound has, include a (meth)acrylic ester group, a (meth)acrylamide group, an allyl group, an isopropenyl group, a vinyl ether group, an epoxy group, a stylyl group, and a vinyl ester group. Among these polymerizable groups, a (meth)acrylic ester group, a (meth)acrylamide group, an allyl group, an isopropenyl group, a vinyl ether group, an epoxy group, and a stylyl group are preferable; a (meth)acrylic ester group, a (meth)acrylamide group, an allyl group, an isopropenyl group, a vinyl ether group, and an epoxy group are more preferable; and a (meth)acrylic ester group, a (meth)acrylamide group, an allyl group, an isopropenyl group, a vinyl ether group, and a glycidyl group are most preferable.

As the above-described amine compound, amine compounds having, as the polymerizable group, an acryloyl group, a methacryloyl group, a glycidyl group, an allyl group, a 2-methylallyl group or a vinyl ether group are preferable. Specific examples of the amine compound having, as the polymerizable group, an acryloyl group, a methacryloyl group, a glycidyl group, an allyl group or a 2-methylallyl group include the following compounds, that are obtained by reacting an amine compound having a terminal hydroxyl group and/or a terminal amino group with a corresponding a (meth)acrylic acid halide, epichrolohydrin, an allyl halide, a 2-methyl-allyl halide or the like.

The number of the polymerizable groups which the foregoing amine compound contains has preferably 15 or less, more preferably 12 or less, further preferably 8 or less, and most preferably 6 or less.

Specific examples of the amine compound having the foregoing polymerizable group will be shown below, but it should not be construed that the invention is limited thereto.

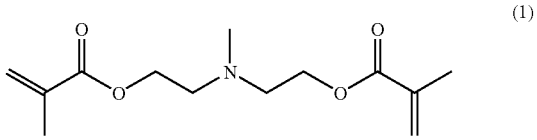

(1)

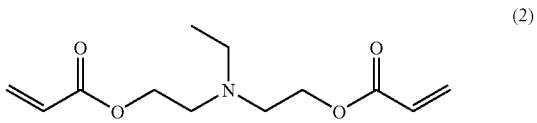

(2)

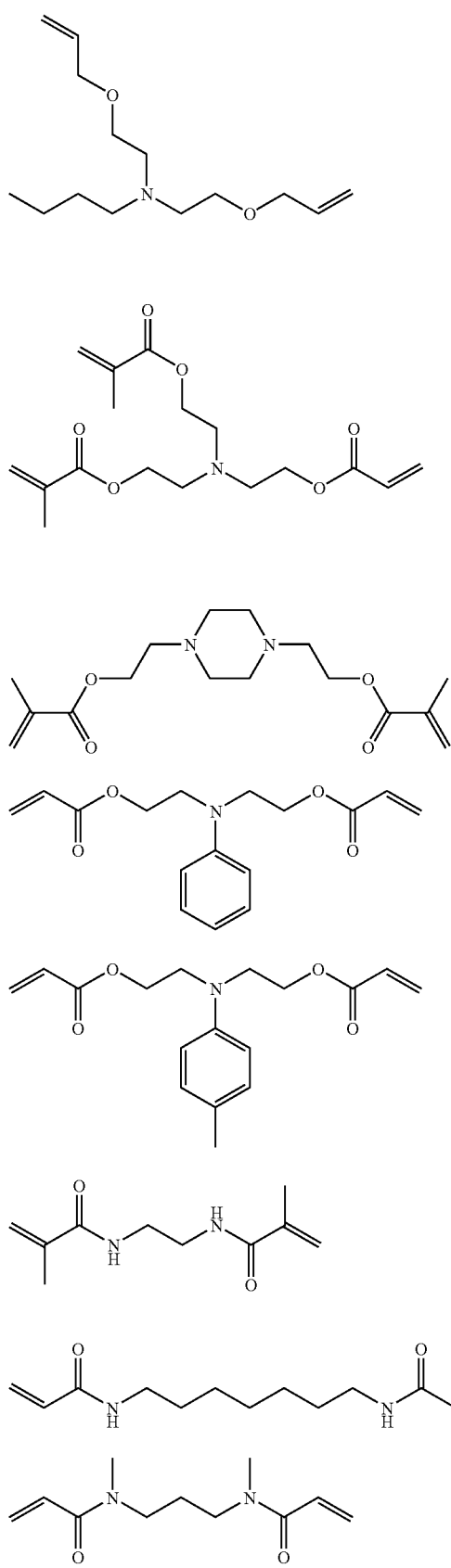
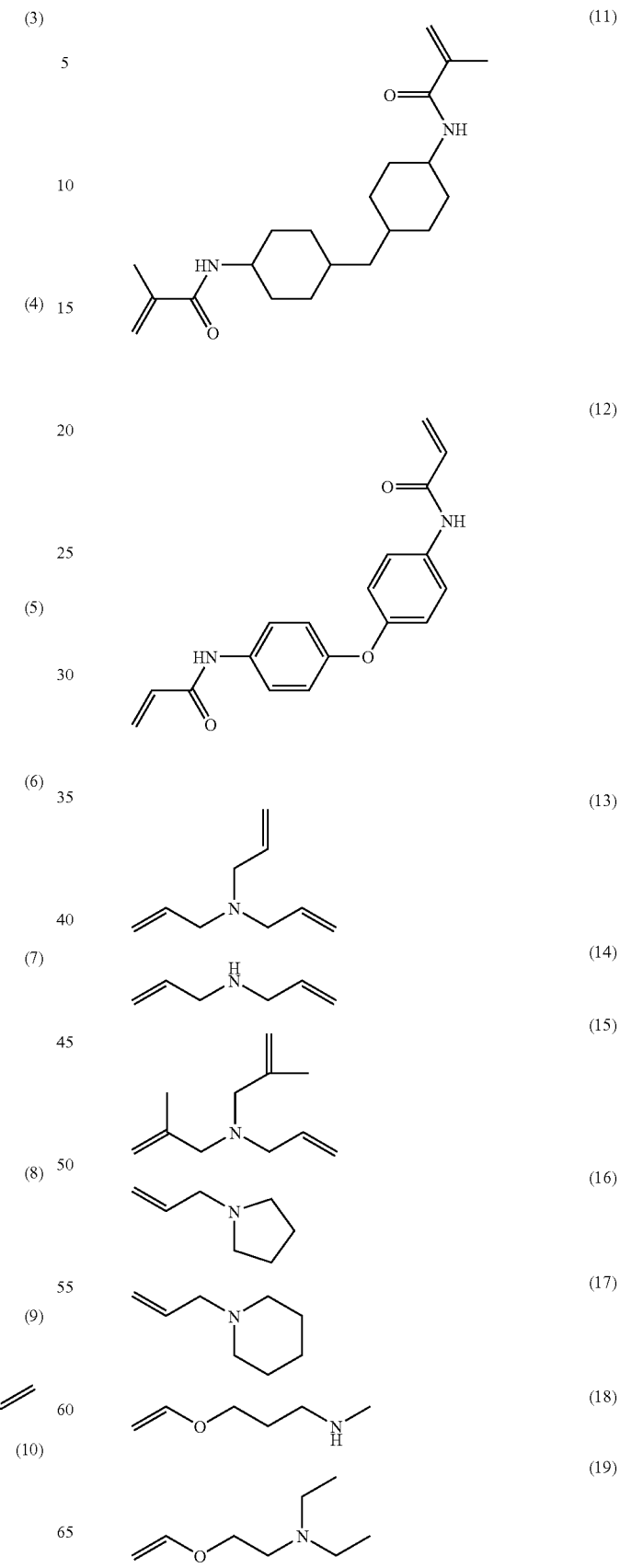

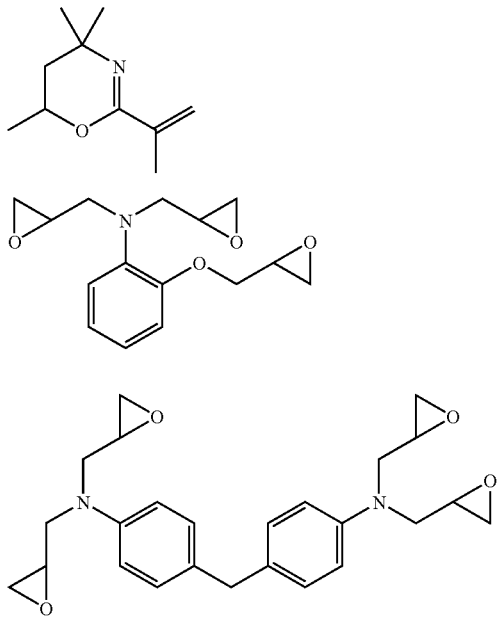

-n-

The numeral value, n in the formula (I) will be explained. n is a value to determine a molar ratio between the acid dye molecule and the amine compound that acts as a counter ion, and the value may freely be selected depending on the conditions to form the acid dye-amine compound salt. Specifically, n represents a numeral value relative to the acid dye, which should satisfy the equivalent range of $0<n\leq10$, and is selected considering all of preferential orders of the required performances, such as solubility in the organic solvent or developing solution, salt forming properties, absorbance, interaction with other components in the curable composition, lightfastness, and heat resistance. When n is selected considering the absorbance only, n is preferably a numeral value for the acid dye which satisfies $0<n\leq8$, more preferably $0<n\leq6$, and most preferably $0<n\leq4$.

Concentration

Next, the concentration of the organic-solvent-soluble dye to be used will be described. The organic-solvent-soluble dye is contained at varying concentrations relative to a total solid content of the dye-containing curable composition of the invention. The concentration varies depending on the kinds of the dye used, but preferably ranges from 0.5 to 80% by mass, more preferably from 0.5 to 60% by mass, and most preferably from 0.5 to 50% by mass.

(Binder)

Next, the binder will be described. The binder used in the invention is not particularly limited insofar as it is alkali-soluble. It is preferably selected from the viewpoints of heat resistance, developability and readily availability.

As the alkali-soluble binder, linear-shaped organic high-molecular polymers that are soluble in an organic solvent and may be developed with a weak alkaline aqueous solution are preferable. Examples of the linear-shaped organic high-molecular polymer include polymers having a carboxylic acid in the side chain thereof, such as methacrylic acid copolymers, acrylic acid copolymers, itaconic acid copolymers, crotonic acid copolymers, maleic acid copolymers, and partially esterified maleic acid copolymers as described in Japanese Patent Application Laid-Open (JP-A) No. 59-44615, Japanese Patent Application Publication (JP-B) Nos. 54-34327, 58-12577, and 54-25957, and JP-A Nos. 59-53836 and 59-71048. Also, acidic cellulose derivatives having a carboxylic acid in the side chain thereof are useful. Besides, hydroxyl group-containing polymers having added thereto an acid anhydride, polyhydroxystyrene-based resins, polysiloxane-based resins, poly(2-hydroxyethyl(meth)acrylate), polyvinylpyrrolidone, polyethylene oxide and polyvinyl alcohol are useful.

Copolymers produced from a hydrophilic group-containing monomer are also useful. Examples of such a monomer include alkoxyallyl(meth)acrylates, hydroxyalkyl(meth)acrylates, glycerol (meth)acrylate, (meth)acrylamide, N-methyloyl acrylamide, secondary or tertiary alkyl acrylamides, dialkylaminoalkyl(meth)acrylates, morpholine(meth)acrylates, N-vinylpyrrolidone, N-vinylcaprolatam, vinyl imidazole, vinyl triazole, methyl(meth)acrylate, ethyl(meth)acrylate, branched or linear propyl(meth)acrylate, branched or linear butyl(meth)acrylate, and phenoxyhydroxypropyl (meth)acrylate.

Other examples of the hydrophilic group-containing monomer include monomers containing a tetrahydrofurfuryl group, phosphoric acid, phosphoric acid ester, a quaternary ammonium salt, an ethyleneoxy chain, a propyleneoxy group, sulfonic acid or a salt thereof, or a morpholinoethyl group.

Further, in order to enhance the crosslinking efficiency, the polymer containing a polymerizable group in the side chain thereof, polymers having an allyl group, a (meth)acryl group or an allyloxyalkyl group in the side chains thereof are useful.

As an example of the polymerizable group-containing polymer, KS RESIST-106 (trade name, manufactured by OSAKA ORGANIC CHEMICAL INDUSTRY LTD.) and CYCLOMER-P SERIES (trade name, manufactured by DAICEL CHEMICAL INDUSTRIES, LTD.) is mentioned.

In order to increase the strength of cured films, alcohol-soluble nylons and a polyether between 2,2-bis(4-hydroxyphenyl)propane and epichlorohydrin are useful.

Among these various binders, polyhydroxystyrene-based resins, polysiloxane-based resins, acrylic resins, acrylamide-based resins and acrylic/acrylamide copolymer resins are preferable binders for use in the invention, from the viewpoint of heat resistance; and acrylic resins, acrylamide-based resins, and acrylic/acrylamide copolymer resins are preferable from the viewpoint of controlling the developability.

As the acrylic resin, copolymers produced from a monomer selected from benzyl(meth)acrylate, (meth)acrylic acid, hydroxyethyl(meth)acrylate, (meth)acrylamide, KS RESIST-106 (trade name, manufactured by OSAKA ORGANIC CHEMICAL INDUSTRY LTD.), and CYCLOMER-P SERIES are preferable. As the binder to be used in the invention, alkali-soluble phenol resins is preferable. The alkali-soluble phenol resin may suitably be used in the case where the composition of the invention is a positive-type composition. Examples of the alkali-soluble phenol resin include novolak resins and vinyl polymers.

As the novolak resin, products obtained by condensing phenols with aldehydes in the presence of an acid catalyst are preferably used. Examples of the phenols include phenol, cresol, ethylphenol, butylphenol, xylenol, phenylphenol, catechol, resorcinol, pyrogallol, naphthol, and bisphenol A. Phenols can be used singly or in combination of two or more thereof. Examples of the aldehyde include formaldehyde, p-formaldehyde, acetaldehyde, propionaldehyde and benzaldehyde.

Specific examples of the novolak resin include condensates of m-cresol, p-cresol or a mixture thereof with formalin. The molecular weight distribution of the novolak resin may be controlled by means of, for example, fractionation. Further, the novolak resin may include a low-molecular component having a phenolic hydroxyl group, such as bisphenol C and bisphenol A.

As the binder, polymers having a weight average molecular weight (in terms of a polystyrene value measured by the GPC method) of from 1,000 to $2\times10^5$ are preferable; polymers having a weight average molecular weight of from 2,000 to $1\times10^5$ are more preferable; and polymers having a weight average molecular weight of from 5,000 to $5\times10^4$ are most preferable.

An amount of the binder to be used in the composition of the invention is preferably from 10 to 90% by mass, more preferably from 20 to 80% by mass, and most preferably from 30 to 70% by mass.

(Crosslinking Agent)

Next, the crosslinking agent will be described. The object of the invention is to provide a highly curable film by allowing a curing reaction in the film to more swiftly proceed than the conventional reaction, using the organic-solvent-soluble dye represented by the above formula (I). Further, it is possible to obtain a still further highly cured film using a crosslinking agent. The crosslinking agent used in the invention is not particularly limited insofar as the film may be cured by crosslinking reaction. Examples of the crosslinking agent include (a) epoxy resins, (b) melamine compounds, guanamine compounds, glycoluryl compounds, or urea compounds, each of which is substituted with at least one substituent selected from a methylol group, an alkoxymethyl group, and an acyloxymethyl group, and (c) phenol compounds, naphthol compounds, or hydroxyanthracene compounds, each of which is substituted with at least one substituent selected from a methylol group, an alkoxymethyl group, and an acyloxymethyl group. Specifically, polyfunctional epoxy resins are preferable as the crosslinking agent.

As the epoxy resin used as the component (a), any crosslinkable compounds having an epoxy group can be used. Examples thereof include divalent glycidyl-containing low-molecular compounds such as bisphenol A diglycidyl ether, ethylene glycol diglycidyl ether, butanediol diglycidyl ether, hexanediol diglycidyl ether, dihydroxybiphenyl diglycidyl ether, diglycidyl phthalate and N,N-diglycidylaniline; trivalent glycidyl group-containing low-molecular compounds such as trimethylolpropane triglycidyl ether, trimethylolphenol triglycidyl ether, and Tris P-PA triglycidyl ether; tetravalent glycidyl group-containing low-molecular compounds such as pentaerythritol tetraglycidyl ether and tetramethylol bisphenol A tetraglycidyl ether; polyvalent glycidyl group-containing low-molecular compounds such as dipentaerythritol pentaglycidyl ether and dipentaerythritol hexaglycidyl ether; and glycidyl group-containing high-molecular compounds such as polyglycidyl(meth)acrylate and a 1,2-epoxy-4-(2-oxiranyl)cyclohexane adduct of 2,2-bis(hydroxymethyl)-1-butanol.

The number of the substituents in the component (b), which are selected from a methylol group, an alkoxymethyl group and an acyloxymethyl group, is from 2 to 6 in the case of the melamine compounds, and from 2 to 4 in the case of the glycoluril compounds, guanamine compounds or urea compounds, respectively, and preferably from 5 to 6 in the case of the melamine compounds, and from 3 to 4 in the case of the glycoluril compounds, guanamine compounds or urea compounds, respectively.

These methylol group-containing compounds are obtained by heating the foregoing alkoxymethyl group-containing compound in an alcohol in the presence of an acid catalyst such as hydrochloric acid, sulfuric acid, nitric acid and methanesulfonic acid. The acyloxymethyl group-containing compound is obtained by mixing, with stirring, the methylol group-containing compound and an acyl chloride in the presence of a basic catalyst.

The compounds having the foregoing substituents will be described below.

Examples of the melamine compounds include hexamethylolmelamine, hexamethoxymethylmelamine, compounds in which one to five methylol groups in hexamethylolmelamine are methoxymethylated or the mixtures thereof, hexamethoxyethylmelamine, hexaacyloxymethylmelamine, and compounds in which one to five methylol groups in hexamethylolmelamine are acyloxymethylated or the mixtures thereof.

Examples of the guanamine compound include tetramethylolguanamine, tetramethoxymethylguanamine, compounds in which from one to three methylol groups in tetramethylolguanmine are methoxymethylated or the mixtures thereof, tetramethoxyethylguanamine, tetraacyloxymethylguanamine, and compounds in which from one or three methylol groups in tetramethylolguanamine are acyloxymethylated or the mixtures thereof.

Examples of the glycoluril compound include tetramethylolglycoluryl, tetramethoxymethylglycoluryl, compounds in which one to three methylol groups of tetramethyloylglycoluryl are methoxymethylated or mixtures thereof, and compounds in which one to three methylol groups in tetramethylolglycoluryl are acyloxymethylated or the mixtures thereof.

Examples of the urea compound include tetramethylolurea, tetramethoxymethylurea, compounds in which one to three methylol groups in tetramethylolurea are methoxymethylated or the mixtures thereof, and tetramethoxyethylurea. These compounds may be used singly or in combination thereof.

The phenol compound, naphthol compound or hydroxyanthracene compound to be contained as the component (c), which is substituted with at least one group selected from a methylol group, an alkoxymethyl group and an acyloxymethyl group, contributes not only to suppress intermixing with a topcoat photoresist but also to increase the film strength by thermal crosslinking, similarly to the case of the component (b) described above.

The number of the substituents in the component (c), which are selected from a methylol group, an alkoxymethyl group and an acyloxymethyl group, should be at least two per molecule. Phenolic compounds in which all of the 2- and 4-positions are substituted are preferable from the viewpoints of thermal crosslinking properties and storabilty.

Further, as the naphthol compound or hydroxyanthracene compound to serve as the skeleton, compounds in which all of the ortho- and para-positions with respect to the OH group are substituted are preferable.

The phenol compound to serve as the skeleton may be unsubstituted or substituted at the 3- or 5-position thereof. And, the naphthol compound to serve as the skeleton may be unsubstituted or substituted at other positions than the ortho-position with respect to the OH group.

The methylol group-containing compounds are obtained by reacting, as the starting material, a compound having a hydrogen atom at the ortho- or para-position (2- or 4-position) with respect to the phenolic OH group with formalin in the presence of a basic catalyst such as sodium hydroxide, potassium hydroxide, ammonia and a tetraalkylammonium hydroxide.

The alkoxymethyl group-containing compounds are obtained by heating the foregoing methylol group-containing compound in an alcohol in the presence of an acid catalyst such as hydrochloric acid, sulfuric acid, nitric acid and methanesulfonic acid.

The acyloxymethyl group-containing compounds are obtained by reacting the foregoing methylol group-containing compound with an acyl chloride in the presence of a basic catalyst.

Examples of the skeleton compound include phenol compounds in which the ortho- or para-position with respect to the phenolic OH group is substituted, naphthol compounds, and hydroxyanthracene compounds, such as phenol, various isomers of cresol, 2,3-xylenol, 2,5-xylenol, 3,4-xylenol, 3,5-xylenol, bisphenols (e.g., bisphenol A), 4,4'-bishydroxybiphenyl, Tris P-PA (trade name, manufactured by HONSHU CHEMICAL INDUSTRY CO., LTD.), naphthol, dihydroxynaphthalene and 2,7-dihydroxyanthracene.

Specific examples of the component (c) include trimethylolphenol, tri(methoxymethyl)phenol, compounds in which one to two methylol groups in trimethylolphenol are methoxymethylated, trimethylol-3-cresol, tri(methoxymethyl)-3-cresol, compounds in which one to two methylol groups in trimethylol-3-cresol are methoxymethylated, dimethylol-cresols such as 2,6-dimethylol-4-cresol, tetramethylol bisphenol A, tetramethoxymethyl bisphenol A, compounds in which one to three methylol groups of tetramethylol bisphenol A are methoxymethylated, tetramethylol-4,4'-bishydroxybiphenyl, tetramethoxymethyl-4,4'-bishydroxybiphenyl, a hexamethylol compound of Tris P-PA, a hexamethoxymethyl compound of Tris P-PA, compounds in which one to five methylol groups in a hexamethylol compound of Tris P-PA are methoxymethylated, and bis-hydroxymethylnaphthalenediol.

As an example of the hydroxyanthracene compounds, 1,6-dihydroxymethyl-2,7-dihydroxyanthracene is mentioned.

Examples of the acyloxymethyl group-containing compounds include compounds in which a part or all of the methylol groups in the foregoing methyl group-containing compounds are acyloxymethylated.

Among these compounds, preferable are trimethylolphenol, bishydroxymethyl-p-cresol, tetramethylol bisphenol A, a hexamethylol compound of Tris P-PA (trade name, manufactured by HONSHU CHEMICAL INDUSTRY CO., LTD.), and phenol compounds in which the methylol groups in the foregoing compounds are substituted with an alkoxymethyl group or both a methylol group and an alkoxymethyl group. These compounds may be used singly or in combination.

The content of the components (a) to (c) in the dye-containing curable composition of the invention varies depending on the kinds thereof used. The component is contained in an amount of preferably from 1 to 70% by mass, more preferably from 5 to 50% by mass, and most preferably from 7 to 30% by mass, relative to a total solid content of the composition.

(Monomer)

Next, the monomer that is contained in the case where the composition of the invention is a negative-type composition will be described. As the monomer, compounds having an ethylenically unsaturated group, that have at least one addition polymerizable ethylene group and have a boiling point of 100° C. or higher at atmospheric pressure, are preferable. Examples thereof include monofunctional acrylates or methacrylates such as polyethylene glycol mono(meth)acrylate, polypropylene glycol mono(meth)acrylate, and phenoxyethyl(meth)acrylate; polyfunctional acrylates or methacrylates such as polyethylene glycol di(meth)acrylate, trimethylolethane tri(meth)acrylate, neopentyl glycol di(meth)acrylate, pentaerythritol tri(meth)acrylate, pentaerythritol tetra(meth)acrylate, dipentaerythritol penta(meth)acrylate, dipentaerythritol hexa(meth)acrylate, hexanediol(meth)acrylate, trimethylolpropane tri(acryloyloxypropyl)ether, tri(acryloyloxyethyl)isocyanurate, compounds obtainable by adding ethylene oxide or propylene oxide to a polyfunctional alcohol (e.g., glycerin or trimethylolethane) and then (meth) acrylating the resultant adduct, urethane acrylates as described in JP-B Nos. 48-41708 and 50-6034 and JP-A No. 51-37193, polyester acrylates described in JP-A No. 48-64183 and JP-B Nos. 49-43191 and 52-30490, and epoxy acrylates obtained as a reaction product between an epoxy resin and (meth)acrylic acid; and the mixtures thereof. In addition, photo-curable monomers and oligomers as described in *Journal of the Adhesion Society of Japan*, Vol. 20, No. 7, pages 300-308 are also useful.

The monomer is contained in an amount of from 0.1 to 90% by mass, more preferably from 1.0 to 80% by mass, and most preferably from 2.0 to 70% by mass, relative to a total solid content of the composition of the invention.

(Photopolymerization Initiator)

Next, the photo-polymerization initiator that is contained in the case where the composition of the invention is a negative-type composition will be described. The photopolymerization initiator is not particularly limited insofar as it can polymerize the polymerizable monomer, but preferably, it is selected from the viewpoints of characteristics, polymerization initiating efficiency, absorption wavelength, readily availability, and costs.

Examples of the photo-polymerization initiator include at least one active halogen compound selected from halomethyl oxadiazole compound and halomethyl-s-triazine compound, 3-aryl-substituted coumarin compound, lophine dimer, benzophenone compound, acetophenone compound and the derivatives thereof, a cyclopentadiene-benzene-iron complex and the salts thereof, and oxime-based compound.

Examples of the active halogen compound, such as halomethyl oxadiazoles, include 2-halomethyl-5-vinyl-1,3,4-oxadiazole compound as described in JP-B No. 57-6096, 2-trichloromethyl-5-styryl-1,3,4-ozadiazole, 2-trichloromethyl-5-(p-cyanostyryl)-1,3,4-oxadiazole, and 2-trichloromethyl-5-(p-methoxystyryl)-1,3,4-oxadiazole.

Examples of the halomethyl-s-triazine compounds used as the photopolymerization initiator include vinyl-halomethyl-s-triazine compound as described in JP-B No. 59-1281, 2-(naphth-1-yl)-4,6-bis-halomethyl-s-triazine compound as described in JP-A No. 53-133428, and 4-(p-aminophenyl)-2,6-di-halomethyl-3-triazine compound as described in JP-A No. 53-133428.

Other examples include 2,4-bis(trichloromethyl)-6-p-methoxystyryl-s-triazine, 2,6-bis(trichloromethyl)-4-(3,4-methylenedioxyphenyl)-1,3,5-triazine, 2,6-bis(trichloromethyl)-4-(4-methoxyphenyl)-1,3,5-triazine, 2,4-bis(trichloromethyl)-6-(1-p-dimethylaminophenyl-1,3-butadienyl)-s-triazine, 2-trichloromethyl-4-amino-6-p-methoxystyryl-s-triazine, 2-(naphth-1-yl)-4,6-bis-trichloromethyl-s-triazine, 2-(4-methoxy-naphth-1-yl)-4,6-bistrichloromethyl-s-triazine, 2-(4-ethoxy-naphth-1-yl)-4,6-bis-trichloromethyl-s-triazine, 2-(4-butoxy-naphth-1-yl)-4,6-bis-trichloromethyl-s-triazine, 2-[4-(2-methoxyethyl)-naphth-1-yl]-4,6-bis-trichloromethyl-s-triazine, 2-[4-(2-ethoxyethyl)-naphth-1-yl]-4,6-bis-trichloromethyl-s-triazine, 2-[4-(2-butoxyethyl)-naphth-1-yl]-4,6-bis-trichloromethyl-s-triazine, 2-(2-methoxy-naphth-1-yl)-4,6-bis-trichloromethyl-s-triazine, 2-(6-methoxy-5-methyl-naphth-2-yl)-4,6-bis-trichloromethyl-s-triazine, 2-(6-methoxy-naphth-2-yl)-4,6-bis-trichloromethyl-s-triazine, 2-(5-methoxy-naphth-1-yl)-4,6-bis-trichloromethyl-4 s-triazine, 2-(4,7-dimethoxy-naphth-1-yl)-4,6-bis-trichloromethyl-s-triazine, 2-(6-ethoxy-naphth-2-yl)-4,6-bis-trichloromethyl-s-triazine, 2-(4,5-dimethoxy-naphth-1-yl)-4,6-bis-trichloromethyl-s-triazine, 4-[p-N,N-di(ethoxycarbonylmethyl)aminophenyl]-2,6-di(trichloromethyl)-s-triazine, 4-[o-methyl-p-N,N-di(ethoxycarbonylmethyl)aminophenyl]-2,6-di(trichloromethyl)-s-triazine, 4-[p-N,N-di(chloroethyl)aminophenyl]-2,6-di(trichloromethyl)-s-triazine, 4-[o-methyl-p-N,N-di(chloroethyl)aminophenyl]-2,6-di(trichloromethyl)-s-triazine, 4-(p-N-chloroethylaminophenyl)-2,6-di(trichloromethyl)-s-triazine, 4-(p-N-ethoxycarbonylmethylaminophenyl)-2,6-di(trichloromethyl)-s-triazine, 4-[p-N,N-di(phenyl)aminophenyl]-2,6-di(trichloromethyl)-s-triazine, 4-(p-N-chloroethylcarbonylaminophenyl)-2,6-di(trichloromethyl)-s-triazine, 4-[p-N-(p-methoxyphenyl)carbonylaminophenyl]-2,6-di(trichloromethyl)-s-triazine, 4-[m-N,N-di(ethoxycarbonylmethyl)aminophenyl]-2,6-di(trichloromethyl)-s-triazine, 4-[m-bromo-p-N,N-di(ethoxycarbonylmethyl)aminophenyl]-2,6-di(trichloromethyl)-s-triazine, 4-[m-chloro-p-N,N-di(ethoxycarbonylmethyl)aminophenyl]-2,6-di(trichloromethyl)-s-triazine, 4-[m-fluoro-p-N,N-di(ethoxycarbonylmethyl)aminophenyl]-2,6-di(trichloromethyl)-s-triazine, 4-[o-bromo-p-N,N-di(ethoxycarbonylmethyl)aminophenyl]-2,6-di(trichloromethyl)-s-triazine, 4-[o-chloro-p-N,N-di(ethoxycarbonylmethyl)aminophenyl]-2,6-di(trichloromethyl)-s-triazine, 4-[o-fluoro-p-N,N-di(ethoxycarbonylmethyl)aminophenyl]-2,6-di(trichloromethyl)-s-triazine, 4-[o-bromo-p-N,N-di(chloroethyl)aminophenyl]-2,6-di(trichloromethyl)-s-triazine, 4-[o-chloro-p-N,N-di(chloroethyl)aminophenyl]-2,6-di(trichloromethyl)-s-triazine, 4-[o-fluoro-p-N,N-di(chloroethyl)aminophenyl]-2,6-di(trichloromethyl)-s-triazine, 4-[m-bromo-p-N,N-di(chloroethyl)aminophenyl]-2,6-di(trichloromethyl)-s-triazine, 4-[m-chloro-p-N,N-di(chloroethyl)aminophenyl]-2,6-di(trichloromethyl)-s-triazine, 4-[m-fluoro-p-N,N-di(chloroethyl)aminophenyl]-2,6-di(trichloromethyl)-s-triazine, 4-(m-bromo-p-N-ethoxycarbonylmethylaminophenyl)-2,6-di(trichloromethyl)-s-triazine, 4-(m-chloro-p-N-ethoxycarbonylmethylaminophenyl)-2,6-di(trichloromethyl)-s-triazine, 4-(m-fluoro-p-N-ethoxycarbonylmethylaminophenyl)-2,6-di(trichloromethyl)-s-triazine, 4-(o-bromo-p-N-ethoxycarbonylmethylaminophenyl)-2,6-di(trichloromethyl)-s-triazine, 4-(o-chloro-p-N-ethoxycarbonylmethylaminophenyl)-2,6-di(trichloromethyl)-s-triazine, 4-(o-fluoro-p-N-ethoxycarbonylmethylaminophenyl)-2,6-di(trichloromethyl)-s-triazine, 4-(m-bromo-p-N-chloroethylaminophenyl)-2,6-di(trichloromethyl)-s-triazine, 4-(m-chloro-p-N-chloroethylaminophenyl)-2,6-di(trichloromethyl)-s-triazine, 4-(m-fluoro-p-N-chloroethylaminophenyl)-2,6-di(trichloromethyl)-s-triazine, 4-(o-bromo-p-N-chloroethylaminophenyl)-2,6-di(trichloromethyl)-s-triazine, 4-(o-chloro-p-N-chloroethylaminophenyl)-2,6-di(trichloromethyl)-s-triazine, and 4-(o-fluoro-p-N-chloroethylaminophenyl)-2,6-di(trichloromethyl)-s-triazine.

In addition to the above compounds, TAZ Series of MIDORI KAGAKU CO., LTD. (e.g., TAZ-107, TAZ-110, TAZ-104, TAZ-109, TAZ-140, TAZ-204, TAZ-113, TAZ-123, TAZ-104), T Series of PANCHIM CORP. (e.g., T-OMS, T-BMP, T-R, T-B), IRGACURE™ Series of CIBA-GEIGY (e.g., IRGACURE™ 369, IRGACURE™ 784, IRGACURE™ 651, IRGACURE™ 184, IRGACURE™ 500, IRGACURE™ 1000, IRGACURE™ 149, IRGACURE™ 819, IRGACURE™ 261), DAROCURE™ Series of CIBA-GEIGY (e.g., DAROCURE™ 1173), 4,4'-bis(diethylamino)-benzophenone, 2-(O-benzoyloxime)-1-[4-(phenylthio)phenyl]-1,2-octanedione, 2-beznyl-2-dimethylamino-4-morpholinobutyrophenone, 2,2-dimethoxy-2-phenylacetophenone, 2-(o-chlorophenyl)-4,5-diphenylimidazolyl dimer, 2-(o-fluorophenyl)-4,5-diphenylimidazolyl dimer, 2-(o-methoxyphenyl)-4,5-diphenylimidazolyl dimer, 2-(p-methoxyphenyl)-4,5-diphenylimidazolyl dimer, 2-(p-dimethoxyphenyl)-4,5-diphenylimidazolyl dimer, 2-(2,4-dimethoxyphenyl)-4,5-diphenylimidazolyl dimer, 2-(p-methylmercaptophenyl)-4,5-diphenylimidazolyl dimer, and benzoin isopropyl ether are also useful.

The photopolymerization initiator may be used in combination with a sensitizer and a photo-stabilizer.

Specific examples include benzoin, benzoin methyl ether, benzoin, 9-fluorenone, 2-chloro-9-fluorenone, 2-methyl-9-fluorenone, 9-anthrone, 2-bromo-9-anthrone, 2-ethyl-9-anthrone, 9,10-anthraquinone, 2-ethyl-9,10-anthraquinone, 2-t-butyl-9,10-anthraquinone, 2,6-dichloro-9,10-anthraquinone, xanthone, 2-methylxanthone, 2-methoxyxanthone, 2-ethoxyxanthone, thioxanthone, 2,4-diethylthioxanthone, acridone, 10-butyl-2-chloroacridone, benzil, dibenzalacetone, p-(dimethylamino)phenyl styryl ketone, p-(dimethylamino)phenyl p-methylstyryl ketone, benzophenone, p-(dimethylamino)benzophenone (or Michler's ketone), p-(diethylamino)benzophenone, benzanthrone, benzothiazole-based compounds as described in JP-B No. 51-48516, TINUVIN™ 1130, and TINUVIN™ 400.

In the composition of the invention, other known photopolymerization initiators other than the foregoing photopolymerization initiators can be incorporated.

Specific examples include vicinal polyketolaldonyl compounds as disclosed in U.S. Pat. No. 2,367,660, α-carbonyl compounds as disclosed in U.S. Pat. Nos. 2,367,661 and 2,367,670, acyloin ethers as disclosed in U.S. Pat. No. 2,448,828, aromatic α-hydrocarbon-substituted acyloin compounds as disclosed in U.S. Pat. No. 2,722,512, polynuclear quinone compounds as disclosed in U.S. Pat. Nos. 3,046,127 and 2,951,758, a combination of triallyl imidazole dimer and p-aminophenyl ketone as disclosed in U.S. Pat. No. 3,549,367, and benzothiazole-based compounds/trihalomethyl-s-triazine-based compounds as disclosed in JP-B No. 51-48516.

The amount of the photopolymerization initiator to be used is preferably from 0.01 to 50% by mass, more preferably from 1 to 30% by mass, and most preferably from 1 to 20% by mass based on the monomer solids content. When the amount of the photopolymerization initiator used is less than 0.01% by mass, the polymerization hardly proceeds. On the other hand, when it exceeds 50% by mass, although the polymerization ratio increases, the molecular weight is lowered to thereby sometimes reduce the film strength.

It is preferable to add a thermal polymerization preventing agent to the composition of the invention, besides the above components. Useful examples of the thermal polymerization preventing agent include hydroquinone, p-methoxyphenol, di-t-butyl p-cresol, pyrogallol, t-butylcatechol, benzoquinone, 4,4'-thiobis(3-methyl-6-t-butylphenol), 2,2'-methylenebis(4-methyl-6-t-butylphenol) and 2-mercaptobenzoimidazole.

Basically, the solvent to be used in the invention is not particularly limited insofar as it meets the solubility and coating properties of the composition, but preferably, it is selected considering solubility of the dye or the binder, coating properties, and safety.

As the solvent to be used during preparation of the composition of the invention, preferably used are esters such as ethyl acetate, n-butyl acetate, isobutyl acetate, amyl formate, isoamyl acetate, isobutyl acetate, butyl propionate, isopropyl butyrate, ethyl butyrate, butyl butyrate, alkyl esters, methyl lactate, ethyl lactate, methyl oxyacetate, ethyl oxyacetate, butyl oxyacetate, methyl methoxyacetate, ethyl methoxyacetate, butyl methoxyacetate, methyl ethoxyacetate, ethyl ethoxyacetate; alkyl 3-oxypropionates (e.g., methyl 3-oxypropionate, ethyl 3-oxypropionate), methyl 3-methoxypropionate, ethyl 3-methoxypropionate, methyl 3-ethoxypropionate, ethyl 3-ethoxypropionate, methyl 2-oxypropionate, ethyl 2-oxypropionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate; methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutanoate, and ethyl 2-oxobutanoate; ethers such as diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, diethylene glycol monobutyl ether, propylene glycol methyl ether, propylene glycol methyl ether acetate, propylene glycol ethyl ether acetate, and propylene glycol propyl ether acetate; ketones such as methyl ethyl ketone, cyclohexanone, 2-heptanone, and 3-heptanone; and aromatic hydrocarbons such as toluene and xylene.

Among these, methyl 3-ethoxypropionate, ethyl 3-ethoxypropionate, ethyl cellosolve acetate, ethyl lactate, diethylene glycol dimethyl ether, butyl acetate, methyl 3-methoxypropionate, 2-heptanone, cyclohexanone, ethyl carbitol acetate, butyl carbitol acetate, propylene glycol methyl ether, and propylene glycol methyl ether acetate are more preferable.

If necessary, the composition of the invention may include various additives such as fillers, high-molecular compounds other than those described above, surfactants, adhesion promoters, antioxidants, WV absorbents and anti-flocculants.

Specific examples of these additives include fillers such as glass and alumina; high-molecular compounds other than the binder resin, such as polyvinyl alcohol, polyacrylic acid, polyethylene glycol monoalkyl ethers, and polyfluoroalkyl acrylates; nonionic, cationic and anionic surfactants; adhesion promoters such as vinyl trimethoxysilane, vinyl triethoxysilane, vinyl tris(2-methoxyethoxy)silane, N-(2-aminoethyl)-3-aminopropylmethyl dimethoxysilane, N-(2-aminoethyl)-3-aminopropyl trimethoxysilane, 3-aminopropyl trimethoxysilane, 3-glycidoxypropyl trimethoxysilane, 3-glycidoxypropylmethyl dimethoxysilane, 2-(3,4-epoxycyclohexyl)ethyl trimethoxysilane, 3-chloropropylmethyl dimethoxysilane, 3-chloropropyl trimethoxysilane, 3-methacryloxypropyl trimethoxysilane, and 3-mercaptopropyl trimtethoxysilane; antioxidants such as 2,2-thiobis(4-methyl-6-t-butylphenol) and 2,6-di-t-butylphenol; UV absorbents such as 2-(3-t-butyl-5-methyl-2-hydroxyphenyl)-5-chlorobenzotriazole and alkoxybenzopheones; and anti-flocculants such as poly(sodium acrylate).

In order to further improve the developability of the composition of the invention by facilitating the alkali-solubility in an area not irradiated with radiation, an organic carboxylic acid, preferably a low-molecular organic carboxylic acid having a molecular weight of 1,000 or less may be added to the composition of the invention. Specific examples of the organic carboxylic acid include aliphatic monocarboxylic acids such as formic acid, acetic acid, propionic acid, butyric acid, valeric acid, pivalic acid, caproic acid, diethylacetic acid, enanthic acid and caprylic acid; aliphatic dicarboxylic acids such as oxalic acid, malonic acid, succinic acid, glutaric acid, adipic acid, pimelic acid, suberic acid, azelaic acid, sebacic acid, brassylic acid, methylmalonic acid, ethylmalonic acid, dimethylmalonic acid, methylsuccinic acid, tetramethylsuccinic acid and citraconic acid; aliphatic tricarboxylic acids such as tricarballylic acid, aconitic acid and camphoronic acid; aromatic monocarboxylic acids such as benzoic acid, toluic acid, cuminic acid, hemellitic acid and mesitylenic acid; aromatic polycarboxylic acids such as phthalic acid, isophthalic acid, terephthalic acid, trimellitic acid, trimesic acid, mellophanic acid and pyromellitic acid; and other carboxylic acids such as phenylacetic acid, hydroatropic acid, hydrocinnamic acid, mandelic acid, phenylsuccinic acid, atropic acid, cinnamic acid, methyl cinnamate, benzyl cinnamate, cinnamylideneacetic acid, cumaric acid and umbellic acid.

(Positive-Type Composition)

In order to obtain a positive-type image, i.e., in the case where the composition of the invention is a positive-type composition, it is preferable to include a naphthoquinonediazide compound to the composition of the invention.

Examples of the naphthoquinonediazide compound include o-naphthoquinonediazide-5-sulfonic acid ester, o-naphthoquinonediazide-5-sulfonic acid amide, o-naphthoquinonediazide-4-sulfonic acid ester, and o-naphthoquinonediazide-4-sulfonic acid amide. These ester or amide compounds may be produced through the conventionally known method using phenol compounds represented by the formula (I) as described in JP-A Nos. 2-84650 and 3-49437.

In the case where the composition of the invention is a positive-type composition, it is preferred to dissolve the alkali-soluble phenol resin and the crosslinking agent in the organic solvent in an amount of from about 2 to 50% by mass and from about 2 to 30% by mass, respectively. Also, it is preferred to add the naphthoquinonediazide compound and the organic-solvent-soluble dye in an amount of from about 2 to 30% by mass and from about 2 to 50% by mass, respectively, to the solution that has the alkali-soluble resin and the crosslinking agent already dissolved therein.

The color filter of the invention is produced using the composition of the invention. The color filter of the invention can be produced by applying the composition of the invention on a substrate employing conventionally coating methods such as rotary coating, cast coating and roll coating, to dispose a radiation-sensitive composition layer, which is then exposed to light through a prescribed mask pattern and developed with a developing solution to thereby form a colored pattern. Further, the production process of the color filter of the invention may optionally include the step of heating and/or light-exposing of the resist pattern for curing.

As the radiations to be used, UV rays such as g-line, h-line and i-line are particularly preferable.

Examples of the substrate include soda glass, PILEX™ glass, quartz glass, glass having a transparent conductive film adhered thereto, and a substrate for photoelectric transfer devices used in image pickup elements or the like, such as a silicon substrate and a complementary metal oxide semiconductor (CMOS). On these substrates, black stripes may be formed so as to isolate pixels from each other.

Further, a subbing layer may be optionally disposed on the substrate in order to improve the adhesiveness to the upper layer, to prevent the substance diffusion, or to flatten the substrate surface.

As the developing solution used for the producing process of the color filter of the invention, any developing solution may be used insofar as it dissolves the composition of the invention but dose not dissolve a radiation-irradiated area. Specifically, a variety of combinations of organic solvents or alkaline aqueous solutions may be used.

As the organic solvent, the foregoing solvents used during preparation of the composition of the invention are preferable.

As the alkaline aqueous solution, an alkaline aqueous solution is used in which an alkaline compound (e.g., sodium hydroxide, potassium hydroxide, sodium carbonate, sodium silicate, sodium metasilicate, ammonia water, ethylamine, diethylamine, dimethylethanolamine, tetramethylammonium hydroxide, tetraethylammonium hydroxide, choline, pyrrole, pyridine, and 1,8-diazabicyclo-[5.4.0]-7-undecene) is dissolved at a concentration from 0.001 to 10% by mass, and preferably from 0.01 to 1% by mass. Incidentally, in the case where a developing solution containing such an alkaline aqueous solution is used, washing with water is usually carried out after the development.

The color filter of the invention can be used for liquid crystal displays or solid-state image elements such as CCD, and is particularly suitable for CCD elements or CMOS elements that have more than 1,000,000 pixels and display high resolution. The color filter of the invention may be used as a color filter by being arranged between a light-receiving portion of respective pixels that constitute CCD, and a light-condensing micro lens.

EXAMPLES

The present invention will be further described with reference to the following Examples, which are not intended in any way to limit the scope of the invention. In the Examples, all "parts" are by mass unless otherwise indicated.

Example 1

1) Preparation of resist solution:

| | |
|---|---|
| Propylene glycol monomethyl ether acetate (PGMEA): | 19.20 parts |

-continued

| | |
|---|---|
| Ethyl lactate: | 36.67 parts |
| Binder (41% PGMEA solution containing a copolymer of benzyl methacrylate/ methacrylic acid/2-hydroxyethyl methacrylate (molar ratio: 60/20/20)): | 30.51 parts |
| Dipentaerythritol hexaacrylate: | 12.20 parts |
| Polymerization inhibitor (p-methoxyphenol): | 0.0061 parts |
| Fluorine-based surfactant: | 0.83 parts |
| Photopolymerization initiator, TAZ-107 (trade name, manufactured by MIDORI KAGAKU CO., LTD.): | 0.586 parts |

The foregoing components were admixed to dissolve and prepare a resist solution.

2) Preparation of Glass Substrate Provided with Subbing Layer:

A glass substrate (CORNING™ 1737) was ultrasonically washed with a 1% NaOH aqueous solution, then with water, and baked for dehydration at 200° C. for 30 minutes.

Then, the resist solution prepared in 1) above was applied on the washed glass substrate using a spin coater to give a film thickness of 2 μm and dried with heating at 220° C. for one hour to obtain a cured film.

3) Preparation of Dye Resist Solution:

The resist solution prepared in 1) above was mixed with each of dye salts and dissolved at respective proportions as shown in Table 1 so as to obtain films having the same absorbance with respect to the same kind of the dyes used.

4) Exposure and Development of Dye Resist (Image Formation):

The dye resist solution prepared in 3) above was applied on the subbing layer of the glass substrate that had been provided with the subbing layer as prepared in 2) above using a spin coater to give a film thickness of 2 μm and pre-baked at 120° C. for 120 seconds.

Then, the coating film was exposed to light having a wavelength of 365 nm at a dose of 800 mJ/cm$^2$ through a 20 μm-thick mask using an exposure apparatus. After the exposure, the resulting film was developed at 26° C. for 60 seconds with a 60% CD-2000 developing solution (manufactured by FUJIFILM ARCH CO., LTD.). Thereafter, the thus developed film was rinsed with running water for 20 seconds and then spray-dried.

In the Examples, image formation was confirmed by the conventional method through observation using an optical microscope and SEM photographs.

The relative absorbance intensity, developability in an unexposed area, and residual layer ratio in an exposed area were each measured by a chromoscope, MCPD-1000 (manufactured by OTSUKA ELECTRONICS CO., LTD.). Incidentally, the developability in an unexposed area means a rate of change in absorbance before and after the development, and the residual layer ratio in an exposed area means a sustained rate of the absorbance value. The results are shown in Table 2.

TABLE 1

| | Dye | Mw of dye | Amine | Mw of amine | Mw of dye salt (dye/amine = 1/2) | Wt % of dye in dye salt | Relative absorbance intensity*[1] | Weight of dye salt | Weight of resist solution |
|---|---|---|---|---|---|---|---|---|---|
| Example 1 | Acid Yellow 42 | 715 | Diethanol amine | 105 | 925 | 77 | 1.29 | 0.66 | 9.34 |
| Example 2 | Acid Yellow 42 | 715 | Triethanol amine | 149 | 1013 | 71 | 1.18 | 0.72 | 9.28 |
| Example 3 | AcidYellow 42 | 715 | Phenyl diethanol amine | 181 | 1077 | 66 | 1.11 | 0.77 | 9.23 |
| Example 4 | Acid Yellow 42 | 715 | Piperidino ethanol | 129 | 973 | 73 | 1.22 | 0.69 | 9.31 |
| Example 5 | Acid Yellow 42 | 715 | 1-Me-2-pyrrolidineethanol | 129 | 973 | 73 | 1.22 | 0.69 | 9.31 |
| Example 6 | Acid Yellow 42 | 715 | Pyrroridino propane diol | 145 | 1005 | 71 | 1.19 | 0.72 | 9.28 |
| Comp. Example 1 | Acid Yellow 42 | 715 | Ditolylguanidine | 239 | 1193 | 60 | 1.00 | 0.85 | 9.15 |
| Comp. Example 2 | Acid Yellow 42 | 715 | Dehydroabiethyl Amine | 285 | 1285 | 56 | 0.93 | 0.92 | 9.08 |
| Example 7 | Acid Blue 120 | 696 | Diethanol amine | 105 | 906 | 77 | 1.30 | 0.65 | 9.35 |
| Comp. Example 3 | Acid Blue 120 | 696 | Ditolylguanidine | 239 | 1174 | 59 | 1.00 | 0.85 | 9.15 |

*[1] based on ditolylguanidine salt (per weight)

Examples 2 to 7

The same procedures were repeated as in Example 1, except that respective dye resist solution compositions in Example 1-3) were changed as shown in the above Table 1. The results are shown in Table 2 including the results in Example 1.

Examples 8 to 14

The same procedures were carried out to form patternwise images as in Examples 1 to 7, except that the glass substrate was changed to a silicon wafer. Consequently, the same results were obtained as in Examples 1 to 7 with respect to the developability in an unexposed area and the residual layer ratio in an exposed area.

In Examples 8 to 14, the silicon wafer was used as the substrate, ! which was different from the substrate used in Examples 1 to 7. However, in all of Examples 1 to 14, the dye resist solution was applied over the subbing layer, whereby the same various performances were obtained without producing any substantial difference.

Comparative Examples 1 to 3

The same procedures were conducted as in Example 1, except that respective dye resist solution compositions in Example 1-3) were changed as shown in the above Table 1. The obtained results are also shown in Table 2.

Examples 15 to 28 and Comparative Examples 4 to 17

The same procedures were followed as in Example 1, except that respective dye resist solution compositions in Example 1-3) were changed as shown in Table 3. The results are shown in Table 3. It was indicated that the same effects exerted in Examples 1 to 7 were obtained against Comparative Examples 1 to 3 as shown in Table 2.

TABLE 2

| | Dye | Amine | Developability of unexposed area | Residual layer ratio of exposed area |
|---|---|---|---|---|
| Example 1 | Acid Yellow 42 | Diethanol amine | 100 | 98 |
| Example 2 | Acid Yellow 42 | Triethanol amine | 100 | 92 |
| Example 3 | Acid Yellow 42 | Phenyl diethanol amine | 100 | 90 |
| Example 4 | Acid Yellow 42 | Piperidino ethanol | 100 | 95 |
| Example 5 | Acid Yellow 42 | 1-Me-2-pyrrolidineethanol | 100 | 95 |
| Example 6 | Acid Yellow 42 | Pyrroridino propanediol | 100 | 93 |
| Comp. Example 1 | Acid Yellow 42 | Ditolylguanidine | 60 | 70 |
| Comp. Example 2 | Acid Yellow 42 | Dehydroabiethylamine | 55 | 65 |
| Example 7 | Acid Blue 120 | Diethanol amine | 100 | 99 |
| Comp. Example 3 | Acid Blue 120 | Ditolylguanidine | 65 | 67 |

TABLE 3

| | Dye | Mw of dye | Amine | Mw of amine | Mw of salt | Wt % of dye in dye salt | Relative absorbance intensity[*1] | Weight of dye salt | Weight of resist | Developability in unexposed area | Residual layer ratio in exposed area |
|---|---|---|---|---|---|---|---|---|---|---|---|
| Example 15 | Acid Red 42 | 484 | Diethanol amine | 105 | 589 | 82 | 1.23 | 0.69 | 9.31 | 100 | 98 |
| Comp. Example 4 | Acid Red 42 | 484 | Ditolylguanidine | 239 | 723 | 67 | 1.00 | 0.85 | 9.15 | 85 | 70 |
| Example 16 | Acid Red 57 | 527 | Diethanol amine | 105 | 632 | 83 | 1.21 | 0.70 | 9.30 | 100 | 93 |
| Comp. Example 5 | Acid Red 57 | 527 | Ditolylguanidine | 239 | 766 | 69 | 1.00 | 0.85 | 9.15 | 60 | 68 |
| Example 17 | Acid Red 143 | 765 | Diethanol amine | 105 | 975 | 78 | 1.27 | 0.67 | 9.33 | 100 | 95 |
| Comp. Example 6 | Acid Red 143 | 765 | Ditolylguanidine | 239 | 1243 | 62 | 1.00 | 0.85 | 9.15 | 65 | 64 |
| Example 18 | Acid Yellow 172 | 582 | Diethanol amine | 105 | 687 | 85 | 1.20 | 0.71 | 9.29 | 100 | 99 |
| Comp. Example 7 | Acid Yellow 172 | 582 | Ditolylguanidine | 239 | 821 | 71 | 1.00 | 0.85 | 9.15 | 70 | 63 |
| Example 19 | Acid Yellow 228 | 889 | Diethanol amine | 105 | 1099 | 81 | 1.24 | 0.68 | 9.32 | 100 | 99 |
| Comp. Example 8 | Acid Yellow 228 | 889 | Ditolylguanidine | 239 | 1367 | 85 | 1.00 | 0.85 | 9.15 | 65 | 67 |
| Example 20 | Acid Blue 80 | 635 | Diethanol amine | 105 | 845 | 75 | 1.32 | 0.65 | 9.35 | 100 | 97 |
| Comp. Example 9 | Acid Blue 80 | 635 | Ditolylguanidine | 239 | 1113 | 57 | 1.00 | 0.85 | 9.15 | 55 | 70 |
| Example 21 | Acid Blue 23 | 532 | Diethanol amine | 105 | 742 | 72 | 1.36 | 0.62 | 9.38 | 100 | 98 |
| Comp. Example 10 | Acid Blue 23 | 532 | Ditolylguanidine | 239 | 1010 | 53 | 1.00 | 0.85 | 9.15 | 60 | 68 |
| Example 22 | Acid Blue 25 | 394 | Diethanol amine | 105 | 499 | 79 | 1.27 | 0.67 | 9.33 | 100 | 97 |
| Comp. Example 11 | Acid Blue 25 | 394 | Ditolylguanidine | 239 | 633 | 62 | 1.00 | 0.85 | 9.15 | 70 | 63 |
| Example 23 | Acid Blue 324:1 | 451 | Diethanol amine | 105 | 550 | 81 | 1.24 | 0.68 | 9.32 | 100 | 95 |
| Comp. Example 12 | Acid Blue 324:1 | 451 | Ditolylguanidine | 239 | 690 | 65 | 1.00 | 0.85 | 9.15 | 55 | 59 |
| Example 24 | Acid Yellow 38 | 687 | Diethanol amine | 105 | 792 | 87 | 1.17 | 0.73 | 9.27 | 100 | 97 |
| Comp. Example 13 | Acid Yellow 38 | 687 | Ditolylguanidine | 239 | 926 | 74 | 1.00 | 0.85 | 9.15 | 67 | 69 |
| Example 25 | Acid Yellow 65 | 591 | Diethanol amine | 105 | 696 | 85 | 1.23 | 0.69 | 9.31 | 100 | 95 |
| Comp. Example 14 | Acid Yellow 65 | 591 | Ditolylguanidine | 239 | 830 | 71 | 1.00 | 0.85 | 9.15 | 62 | 65 |
| Example 26 | Acid Yellow 29 | 570 | Diethanol amine | 105 | 780 | 73 | 1.34 | 0.63 | 9.37 | 100 | 97 |
| Comp. Example 15 | Acid Yellow 29 | 570 | Ditolylguanidine | 239 | 1048 | 54 | 1.00 | 0.85 | 9.15 | 60 | 63 |
| Example 27 | Acid Yellow 220 | 1118 | Diethanol amine | 105 | 1223 | 91 | 1.11 | 0.77 | 9.23 | 100 | 98 |
| Comp. Example 16 | Acid Yellow 220 | 1118 | Ditolylguanidine | 239 | 1357 | 82 | 1.00 | 0.85 | 9.15 | 71 | 64 |
| Example 28 | Mordant Yellow 3 | 416 | Diethanol amine | 105 | 626 | 66 | 1.43 | 0.60 | 9.40 | 100 | 98 |
| Comp. Example 17 | Mordant Yellow 3 | 416 | Ditolylguanidine | 239 | 894 | 47 | 1.00 | 0.85 | 9.15 | 68 | 68 |

[*1] based on ditolylguanidine salt (per weight)

As shown in Comparative Examples 1 to 17, it has heretofore been difficult to satisfy both a suitable developability in an unexposed area and a suitable residual layer ratio in an exposed area, whereas when the dye bonded with a low-molecular amine compound having an OH group as a counter ion (the dye represented by the formula (I)) according to the invention was used, the developability in an unexposed area was good, and the addition amount of the dye could be reduced, to thereby obtain a curable composition which had increased curability in an exposed area and improved the residual layer ratio in an exposed area.

Further, as is evident from the results of Tables 2 and 3, when the dye bonded with a low-molecular amine compound having an OH group as a counter ion (the dye represented by the formula (I)) according to the invention was used, a curable composition having excellent developability in an unexposed area and improved residual layer ratio in an exposed area could be produced. These results demonstrate that by using to the composition of the invention, sufficient polymerization properties and curability can be obtained, and excellent performances of the developability in an unexposed area and the residual layer ratio in an exposed area are achieved, and hence, the composition is revealed to be useful as a dye-containing curable composition.

In contrast, in the Comparative Examples in which the amine compound having a high molecular weight and exhibiting poor compatibility with the solvent or the developing solution was used, the use amount of the dye increased, and the curability and solubility were reduced, to thus yield severely inferior results.

Example 29

The same procedures were carried out as in Example 1 to prepare a resist solution, from which a subbing layer was prepared on the glass substrate, to thereby produce a cured film. The obtained resist solution was mixed with each of dye salts and dissolved at proportions as shown in Table 4 so as to produce the film having the same absorbance with respect to the same kind of the dyes used.

Then, the dye resist was subjected to exposure and development (image formation) in the same manner as in Example 1. In this Example 29, the image formation was confirmed by the conventional method through observation using an optical microscope and SEM photographs. The relative absorbance intensity, developability in an unexposed area, and residual layer ratio in an exposed area were each measured using a chromoscope, MCPD-1000 (manufactured by OTSUKA ELECTRONICS CO., LTD.). Incidentally, the developability in an unexposed area means a rate of change in absorbance before and after the development, and the residual layer ratio in an exposed area means a sustained rate of the absorbance value. The results are shown in Table 4.

TABLE 4

| | Dye | Mw of dye | Amine | Mw of amine | Mw of dye salt (dye/amine = ½) | Wt % of dye in dye salt | Relative absorbance intensity[*1] | Weight of dye salt | Weight of resist solution |
|---|---|---|---|---|---|---|---|---|---|
| Example 29 | Acid Yellow 42 | 715 | (structure) | 89.14 | 893.28 | 80 | 1.33 | 0.64 | 9.36 |
| Example 30 | Acid Yellow 42 | 715 | (structure) | 133.19 | 981.38 | 73 | 1.21 | 0.70 | 9.30 |
| Example 31 | Acid Yellow 42 | 715 | (structure) | 143 | 1001 | 71 | 1.19 | 0.71 | 9.29 |
| Example 32 | Acid Yellow 42 | 715 | (structure) | 101 | 917 | 78 | 1.30 | 0.65 | 9.35 |
| Example 33 | Acid Yellow 42 | 715 | (structure) | 153 | 1021 | 70 | 1.17 | 0.73 | 9.27 |
| Example 34 | Acid Yellow 42 | 715 | (structure) | 101 | 917 | 78 | 1.30 | 0.65 | 9.35 |
| Comp. Example 18 | Acid Yellow 42 | 715 | Ditolylguanidine | 239 | 1193 | 60 | 1.00 | 0.85 | 9.15 |
| Comp. | Acid Yellow 42 | 715 | Dehydroabiethylamine | 285 | 1285 | 56 | 0.93 | 0.92 | 9.08 |

TABLE 4-continued

| | Dye | Mw of dye | Amine | Mw of amine | Mw of dye salt (dye/amine = ½) | Wt % of dye in dye salt | Relative absorbance intensity[*1] | Weight of dye salt | Weight of resist solution |
|---|---|---|---|---|---|---|---|---|---|
| Example 19 | | | | | | | | | |
| Example 35 | Acid Blue 120 | 696 | ⟨O–CH₂CH₂–NH–CH₂CH₂–O⟩ | 133.19 | 962.38 | 72 | 1.23 | 0.69 | 9.31 |
| Comp. Example 20 | Acid Blue 120 | 696 | Ditolylguanidine | 239 | 1174 | 59 | 1.00 | 0.85 | 9.15 |

[*1]based on ditolylguanidine salt (per weight)

Examples 30 to 35

The same procedures were followed as in Example 29, except that the dye resist solution composition in Example 29 was changed as shown in the above Table 4. The results are shown in Table 5 including the results of Example 29.

Examples 36 to 42

The same procedures were conducted to form pattern-wise images as in Examples 29 to 35, except that the glass substrate was changed to a silicon wafer. It was indicated that the same results were obtained as in Examples 29 to 35 with respect to the developability in an unexposed area and the residual layer ratio in an exposed area.

In Examples 36 to 42, the silicon wafer is used as the substrate, which was different from that in Examples 29 to 35. However, in all of Examples 29 to 42, the dye resist solution was applied over the subbing layer, whereby the same various performances were achieved without producing any substantial difference.

Comparative Examples 18 to 20

The same procedures were repeated as in Example 29, except that the dye resist solution composition in Example 29 was changed as shown in the above Table 4. The results are shown in Table 5.

Examples 43 to 56 and Comparative Examples 21 to 34

The same procedures were carried out as in Example 29, except that the dye resist solution composition in Example 29 was changed as shown in Table 6. The results are shown in Table 6.

TABLE 5

| | Dye | Amine | Developability in an unexposed area | Residual layer ratio in an exposed area |
|---|---|---|---|---|
| Example 29 | Acid Yellow 42 | CH₃O–(CH₂)₃–NH₂ | 100 | 99 |
| Example 30 | Acid Yellow 42 | CH₃O–CH₂CH₂–NH–CH₂CH₂–OCH₃ | 100 | 93 |
| Example 31 | Acid Yellow 42 | CH₂=CH–O–CH₂CH₂–N(C₂H₅)₂ | 100 | 91 |
| Example 32 | Acid Yellow 42 | morpholine-N-CH₃ | 100 | 96 |
| Example 33 | Acid Yellow 42 | 3,5-dimethoxyaniline | 100 | 96 |
| Example 34 | Acid Yellow 42 | tetrahydrofurfurylamine | 100 | 94 |

TABLE 5-continued

|  | Dye | Amine | Developability in an unexposed area | Residual layer ratio in an exposed area |
|---|---|---|---|---|
| Comp. Example 18 | Acid Yellow 42 | Ditolylguanidine | 59 | 69 |
| Comp. Example 19 | Acid Yellow 42 | Dehydroabiethylamine | 56 | 64 |
| Example 35 | Acid Blue 120 | 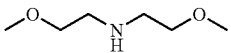 | 100 | 98 |
| Comp. Example 20 | Acid Blue 120 | Ditolylguanidine | 66 | 68 |

TABLE 6

|  | Dye | Mw of dye | Amine | Mw of amine | Mw of salt | Wt % of dye in dye salt | Relative absorbance intensity*[1] | Weight of dye salt | Weight of resist | Developability in unexposed area | Residual layer ratio in exposed area |
|---|---|---|---|---|---|---|---|---|---|---|---|
| Example 43 | Acid Red 42 | 484 | Bis(2-methoxy-ethyl)amine | 133 | 617 | 78 | 1.17 | 0.73 | 9.27 | 100 | 99 |
| Comp. Example 21 | Acid Red 42 | 484 | Ditolylguanidine | 239 | 723 | 67 | 1.00 | 0.85 | 9.15 | 66 | 72 |
| Example 44 | Acid Red 57 | 527 | Bis(2-methoxy-ethyl)amine | 133 | 660 | 80 | 1.16 | 0.73 | 9.27 | 100 | 94 |
| Comp. Example 22 | Acid Red 57 | 527 | Ditolylguanidine | 239 | 766 | 69 | 1.00 | 0.85 | 9.15 | 62 | 69 |
| Example 45 | Acid Red 143 | 765 | Bis(2-methoxy-ethyl)amine | 133 | 1031 | 74 | 1.21 | 0.71 | 9.29 | 100 | 96 |
| Comp. Example 23 | Acid Red 143 | 765 | Ditolylguanidine | 239 | 1243 | 62 | 1.00 | 0.85 | 9.15 | 67 | 66 |
| Example 46 | Acid Yellow 172 | 582 | Bis(2-methoxy-ethyl)amine | 133 | 715 | 81 | 1.15 | 0.74 | 9.26 | 100 | 99 |
| Comp. Example 24 | Acid Yellow 172 | 582 | Ditolylguanidine | 239 | 821 | 71 | 1.00 | 0.85 | 9.15 | 75 | 65 |
| Example 47 | Acid Yellow 228 | 889 | Bis(2-methoxy-ethyl)amine | 133 | 1155 | 77 | 1.18 | 0.72 | 9.28 | 100 | 100 |
| Comp. Example 25 | Acid Yellow 228 | 889 | Ditolylguanidine | 239 | 1367 | 65 | 1.00 | 0.85 | 9.15 | 67 | 69 |
| Example 48 | Acid Blue 80 | 635 | Bis(2-methoxy-ethyl)amine | 133 | 901 | 70 | 1.24 | 0.69 | 9.31 | 100 | 99 |
| Comp. Example 26 | Acid Blue 80 | 635 | Ditolylguanidine | 239 | 1113 | 57 | 1.00 | 0.85 | 9.15 | 59 | 71 |
| Example 49 | Acid Blue 23 | 532 | Bis(2-methoxy-ethyl)amine | 133 | 796 | 67 | 1.27 | 0.67 | 9.33 | 100 | 99 |
| Comp. Example 27 | Acid Blue 23 | 532 | Ditolylguanidine | 239 | 1010 | 53 | 1.00 | 0.85 | 9.15 | 63 | 69 |
| Example 50 | Acid Blue 25 | 394 | Bis(2-methoxy-ethyl)amine | 133 | 527 | 75 | 1.20 | 0.71 | 9.29 | 100 | 96 |
| Comp. Example 28 | Acid Blue 25 | 394 | Ditolylguanidine | 239 | 633 | 62 | 1.00 | 0.85 | 9.15 | 72 | 64 |
| Example 51 | Acid Blue 324:1 | 451 | Bis(2-methoxy-ethyl)amine | 133 | 584 | 77 | 1.18 | 0.72 | 9.28 | 100 | 97 |
| Comp. Example 29 | Acid Blue 324:1 | 451 | Ditolylguanidine | 239 | 690 | 65 | 1.00 | 0.85 | 9.15 | 57 | 61 |
| Example 52 | Acid Yellow 38 | 687 | Bis(2-methoxy-ethyl)amine | 133 | 820 | 84 | 1.13 | 0.75 | 9.25 | 100 | 98 |
| Comparative Example 30 | Acid Yellow 38 | 687 | Ditolylguanidine | 239 | 926 | 74 | 1.00 | 0.85 | 9.15 | 68 | 68 |

TABLE 6-continued

| | Dye | Mw of dye | Amine | Mw of amine | Mw of salt | Wt % of dye in dye salt | Relative absorbance intensity*[1] | Weight of dye salt | Weight of resist | Developability in unexposed area | Residual layer ratio in exposed area |
|---|---|---|---|---|---|---|---|---|---|---|---|
| Example 53 | Acid Yellow 65 | 591 | Bis(2-methoxyethyl)amine | 133 | 724 | 82 | 1.18 | 0.72 | 9.28 | 100 | 96 |
| Comp. Example 31 | Acid Yellow 65 | 591 | Ditolylguanidine | 239 | 830 | 71 | 1.00 | 0.85 | 9.15 | 65 | 64 |
| Example 54 | Acid Yellow 29 | 570 | Bis(2-methoxyethyl)amine | 133 | 836 | 68 | 1.25 | 0.68 | 9.32 | 100 | 98 |
| Comp. Example 32 | Acid Yellow 29 | 570 | Ditolylguanidine | 239 | 1048 | 54 | 1.00 | 0.85 | 9.15 | 64 | 64 |
| Example 55 | Acid Yellow 220 | 1118 | Bis(2-methoxyethyl)amine | 133 | 1251 | 89 | 1.08 | 0.78 | 9.22 | 100 | 98 |
| Comp. Example 33 | Acid Yellow 220 | 1118 | Ditolylguanidine | 239 | 1357 | 82 | 1.00 | 0.85 | 9.15 | 69 | 67 |
| Example 56 | Mordant Yellow 3 | 416 | Bis(2-methoxyethyl)amine | 133 | 682 | 61 | 1.31 | 0.65 | 9.35 | 100 | 97 |
| Comp. Example 34 | Mordant Yellow 3 | 416 | Ditolylguanidine | 239 | 894 | 47 | 1.00 | 0.85 | 9.15 | 67 | 67 |

*[1]based on ditolylguanidine salt (per weight)

As shown in Comparative Examples 18 to 34, it has heretofore been difficult to satisfy both a suitable developability in an unexposed area and a suitable residual layer ratio in an exposed area, whereas when the dye bonded with a low-molecular amine compound having an oxygen atom that forms an ether bond as a counter ion (the dye represented by the formula (I)) according to the invention was used, the developability in an unexposed area was good, and the addition amount of the dye could be reduced, to thereby obtain a curable composition which had increased curability in an exposed area and improved the residual layer ratio in an exposed area.

Further, as is evident from the results of Tables 5 and 6, when the dye bonded with a low-molecular amine compound having an oxygen atom that forms an ether bond as a counter ion (the dye represented by the formula (I)) according to the invention was used, a curable composition having excellent developability in an unexposed area and improved residual layer ratio in an exposed area could be produced. These results demonstrate that by using the composition of the invention, sufficient polymerization properties and curability can be obtained, and excellent performances of the developability in an unexposed area and the residual layer ratio in an exposed area are achieved, and hence, the composition is revealed to be useful as a dye-containing curable composition.

In contrast, in the Comparative Examples in which the amine compound having a high molecular weight and exhibiting poor compatibility with the solvent or the developing solution was used, the use amount of the dye increased, and the curability and solubility were reduced, to thus give severely inferior results.

Example 57

The same procedures were carried out as in Example 1 to prepare a resist solution, from which a subbing layer was prepared on the glass substrate, to thereby produce a cured film. The obtained resist solution was mixed with each of dye salts and dissolved at proportions as shown in Table 7 so as to produce the film having the same absorbance with respect to the same kind of the dyes used.

Then, the dye resist was subjected to exposure and development (image formation) in the same manner as in Example 1. In this Example 57, the image formation was confirmed by the conventional method through observation using an optical microscope and SEM photographs. The relative absorbance intensity, developability in an unexposed area, and residual layer ratio in an exposed area were each measured using a chromoscope, MCPD-1000 (manufactured by OTSUKA ELECTRONICS CO., LTD.). Incidentally, the developability in an unexposed area means a rate of change in absorbance before and after the development, and the residual layer ratio in an exposed area means a sustained rate of the absorbance value. The results are shown in Table 7.

TABLE 7

| | Dye | Mw of dye | Amine | Mw of amine | Mw of dye salt (dye/amine = 1/2) | Wt % of dye in dye salt | Relative absorbance intensity*[1] | Weight of dye salt | Weight of resist solution |
|---|---|---|---|---|---|---|---|---|---|
| Example 57 | Acid Yellow 42 | 715 | Compound of Specific Example (1) | 255.3 | 1226 | 58 | 0.97 | 0.87 | 9.13 |
| Example 58 | Acid Yellow 42 | 715 | Compound of Specific Example (4) | 339.4 | 1394 | 51 | 0.85 | 0.99 | 9.01 |
| Example 59 | Acid Yellow 42 | 715 | Compound of Specific Example (5) | 310.4 | 1336 | 54 | 0.89 | 0.95 | 9.05 |

TABLE 7-continued

| | Dye | Mw of dye | Amine | Mw of amine | Mw of dye salt (dye/amine = 1/2) | Wt % of dye in dye salt | Relative absorbance intensity[*1] | Weight of dye salt | Weight of resist solution |
|---|---|---|---|---|---|---|---|---|---|
| Example 60 | Acid Yellow 42 | 715 | Compound of Specific Example (6) | 289.3 | 1294 | 55 | 0.92 | 0.92 | 9.08 |
| Example 61 | Acid Yellow 42 | 715 | Compound of Specific Example (11) | 346.5 | 1408 | 51 | 0.85 | 1.00 | 9.00 |
| Example 62 | Acid Yellow 42 | 715 | Compound of Specific Example (15) | 179.3 | 1074 | 67 | 1.11 | 0.77 | 9.23 |
| Comp. Example 35 | Acid Yellow 42 | 715 | Ditolylguanidine | 239 | 1193 | 60 | 1.00 | 0.85 | 9.15 |
| Comp. Example 36 | Acid Yellow 42 | 715 | Dehydroabiethylamine | 285 | 1285 | 56 | 0.93 | 0.92 | 9.08 |
| Example 63 | Acid Blue 120 | 696 | Compound of Specific Example (20) | 167.3 | 1031 | 68 | 1.14 | 0.74 | 9.26 |
| Comp. Example 37 | Acid Blue 120 | 696 | Ditolylguanidine | 239 | 1174 | 59 | 1.00 | 0.85 | 9.15 |

[*1]based on ditolylguanidine salt (per weight)

Examples 58 to 63

The same procedures were performed as in Example 57, except that the dye resist solution composition in Example 57 was changed as shown in the above Table 7. The results are shown in Table 8 including the results of Example 57.

Examples 64 to 70

The same procedures were repeated to form pattern-wise images as in Examples 57 to 63, except that the glass substrate was changed to a silicon wafer. It was indicated that the same results were obtained as in Examples 57 to 63 with respect to the developability in an unexposed area and the residual layer ratio in an exposed area.

In Examples 64 to 70, the silicon wafer was used as the substrate, which was different from the substrate used in Examples 57 to 63. However, in all of Examples 57 to 70, the dye resist solution was applied over the subbing layer, whereby the same various performances were obtained without producing any substantial difference.

Comparative Examples 35 to 37

The same procedures were conducted as in Example 57 were followed, except that the dye resist solution composition in Example 57 was changed as shown in the above Table 7. The results are also shown in Table 8.

Examples 70 to 83 and Comparative Examples 38 to 51

The same procedures were performed as in Example 57, except that the dye resist solution composition in Example 57 was changed as shown in Table 9. The results are shown in Table 9.

TABLE 8

| | Dye | Amine | Developability in unexposed area | Residual layer ratio in exposed area |
|---|---|---|---|---|
| Example 57 | Acid Yellow 42 | Compound of Specific Example (1) | 100 | 99 |
| Example 58 | Acid Yellow 42 | Compound of Specific Example (4) | 100 | 100 |
| Example 59 | Acid Yellow 42 | Compound of Specific Example (5) | 100 | 99 |
| Example 60 | Acid Yellow 42 | Compound of Specific Example (6) | 100 | 98 |
| Example 61 | Acid Yellow 42 | Compound of Specific Example (11) | 100 | 98 |
| Example 62 | Acid Yellow 42 | Compound of Specific Example (15) | 100 | 97 |
| Comp. Example 35 | Acid Yellow 42 | Ditolylguanidine | 59 | 69 |
| Comp. Example 36 | Acid Yellow 42 | Dehydroabiethylamine | 56 | 64 |
| Example 63 | Acid Blue 120 | Compound of Specific Example(20) | 100 | 97 |
| Comp. Example 37 | Acid Blue 120 | Ditolylguanidine | 66 | 68 |

TABLE 9

| | Dye | Mw of dye | Amine | Mw of amine | Mw of salt | Wt % of dye in dye salt | Relative absorbance intensity*1 | Weight of dye salt | Weight of resist | Developability in unexposed area | Residual layer ratio in exposed area |
|---|---|---|---|---|---|---|---|---|---|---|---|
| Example 70 | Acid Red 42 | 484 | Compound of Specific Example (1) | 255 | 739 | 65 | 0.88 | 0.87 | 9.13 | 100 | 99 |
| Comp. Example 38 | Acid Red 42 | 484 | Ditolylguanidine | 239 | 723 | 67 | 1.00 | 0.85 | 9.15 | 63 | 75 |
| Example 71 | Acid Red 57 | 527 | Compound of Specific Example (1) | 255 | 782 | 67 | 0.88 | 0.87 | 9.13 | 100 | 95 |
| Comp. Example 39 | Acid Red 57 | 527 | Ditolylguanidine | 239 | 766 | 69 | 1.00 | 0.85 | 9.15 | 61 | 71 |
| Example 72 | Acid Red 143 | 765 | Compound of Specific Example (1) | 255 | 1275 | 60 | 0.97 | 0.87 | 9.13 | 100 | 97 |
| Comp. Example 40 | Acid Red 143 | 765 | Ditolylguanidine | 239 | 1243 | 62 | 1.00 | 0.85 | 9.15 | 65 | 68 |
| Example 73 | Acid Yellow 172 | 582 | Compound of Specific Example (1) | 255 | 837 | 70 | 0.98 | 0.87 | 9.13 | 100 | 99 |
| Comp. Example 41 | Acid Yellow 172 | 582 | Ditolylguanidine | 239 | 821 | 71 | 1.00 | 0.85 | 9.15 | 73 | 68 |
| Example 74 | Acid Yellow 228 | 889 | Compound of Specific Example (1) | 255 | 1399 | 64 | 0.99 | 0.87 | 9.13 | 100 | 100 |
| Comp. Example 42 | Acid Yellow 228 | 889 | Ditolylguanidine | 239 | 1367 | 65 | 1.00 | 0.85 | 9.15 | 66 | 71 |
| Example 75 | Acid Blue 80 | 635 | Compound of Specific Example (1) | 255 | 1145 | 55 | 0.97 | 0.87 | 9.13 | 100 | 99 |
| Comp. Example 43 | Acid Blue 80 | 635 | Ditolylguanidine | 239 | 1113 | 57 | 1.00 | 0.85 | 9.15 | 57 | 73 |
| Example 76 | Acid Blue 23 | 532 | Compound of Specific Example (1) | 255 | 1042 | 51 | 0.97 | 0.88 | 9.12 | 100 | 99 |
| Comp. Example 44 | Acid Blue 23 | 532 | Ditolylguanidine | 239 | 1010 | 53 | 1.00 | 0.85 | 9.15 | 60 | 71 |
| Example 77 | Acid Blue 25 | 394 | Compound of Specific Example (1) | 255 | 649 | 61 | 0.98 | 0.87 | 9.13 | 100 | 99 |
| Comp. Example 45 | Acid Blue 25 | 394 | Ditolylguanidine | 239 | 633 | 62 | 1.00 | 0.85 | 9.15 | 70 | 69 |
| Example 78 | Acid Blue 324:1 | 451 | Compound of Specific Example (1) | 255 | 706 | 64 | 0.96 | 0.87 | 9.13 | 100 | 98 |
| Comp. Example 46 | Acid Blue 324:1 | 451 | Ditolylguanidine | 239 | 690 | 55 | 1.00 | 0.85 | 9.15 | 55 | 65 |
| Example 79 | Acid Yellow 38 | 687 | Compound of Specific Example (1) | 255 | 942 | 73 | 0.98 | 0.86 | 9.14 | 100 | 99 |
| Comp. Example 47 | Acid Yellow 38 | 687 | Ditolylguanidine | 239 | 926 | 74 | 1.00 | 0.85 | 9.15 | 67 | 67 |
| Example 80 | Acid Yellow 65 | 591 | Compound of Specific Example (1) | 255 | 846 | 70 | 1.01 | 0.84 | 9.16 | 100 | 98 |
| Comp. Example 48 | Acid Yellow 65 | 591 | Ditolylguanidine | 239 | 830 | 71 | 1.00 | 0.85 | 9.15 | 67 | 67 |
| Example 81 | Acid Yellow 29 | 570 | Compound of Specific Example (1) | 255 | 1080 | 53 | 0.97 | 0.88 | 9.12 | 100 | 99 |
| Comp. Example 49 | Acid Yellow 29 | 570 | Ditolylguanidine | 239 | 1048 | 54 | 1.00 | 0.85 | 9.15 | 63 | 68 |

TABLE 9-continued

| | Dye | Mw of dye | Amine | Mw of amine | Mw of salt | Wt % of dye in dye salt | Relative absorbance intensity*[1] | Weight of dye salt | Weight of resist | Developability in unexposed area | Residual layer ratio in exposed area |
|---|---|---|---|---|---|---|---|---|---|---|---|
| Example 82 | Acid Yellow 220 | 1118 | Compound of Specific Example (1) | 255 | 1373 | 81 | 0.99 | 0.86 | 9.14 | 100 | 98 |
| Comp. Example 50 | Acid Yellow 220 | 1118 | Ditolylguanidine | 239 | 1357 | 82 | 1.00 | 0.85 | 9.15 | 66 | 68 |
| Example 83 | Mordant Yellow 3 | 416 | Compound of Specific Example (1) | 255 | 926 | 45 | 0.97 | 0.88 | 9.12 | 100 | 98 |
| Comp. Example 51 | Mordant Yellow 3 | 416 | Ditolylguanidine | 239 | 894 | 47 | 1.00 | 0.85 | 9.15 | 68 | 68 |

*[1]based on ditolylguanidine salt (per weight)

As shown in Comparative Examples 35 to 51, it has heretofore been difficult to satisfy both a suitable developability in an unexposed area and a suitable residual layer ratio in an exposed area, whereas when the dye bonded with a low-molecular amine compound having a polymerizable group as a counter ion (the dye represented by the formula (I)) according to the invention was used, the developability in an unexposed area was good, and the addition amount of the dye could be reduced, to thereby obtain a curable composition which had increased curability in an exposed area and improved the residual layer ratio in an exposed area.

Further, as is evident from the results of Tables 8 and 9, when the dye bonded with a low-molecular amine compound having a polymerizable group as a counter ion (the dye represented by the formula (I)) according to the invention was used, a curable composition having excellent developability in an unexposed area and improved residual layer ratio in an exposed area could be produced. These results demonstrate that by using the composition of the invention, sufficient polymerization properties and curability can be obtained, and excellent performances of the developability in an unexposed area and the residual layer ratio in an exposed area are achieved, and hence, the composition is revealed to be useful as a dye-containing curable composition.

In contrast, in the Comparative Examples in which the amine compound having a high molecular weight and exhibiting poor compatibility with the solvent or the developing solution was used, the use amount of the dye increased, and the curability and solubility were reduced, to thus afford severely inferior results.

Example 84

The same procedures were carried out as in Example 57, except that in Example 84, the compound of Specific Example (1) was replaced with the compound of Specific Example (22), the solution composition was changed to satisfy the molecular weight to that of the compound of Specific Example (22), and after the exposure and development, heat treatment was carried out at 160° C. for one minute. It was revealed that the developability in an unexposed area was 100, and the residual layer ratio in an exposed area was 98.

Thus, as seen from the results of Example 84, when the dye bonded with a low-molecular amine compound having a polymerizable group as a counter ion according to the invention was used, a dye-containing curable composition having excellent developability in an unexposed area and exhibiting high residual layer ratio in an exposed area was produced.

As detailed above, the present invention provides a dye-containing curable composition that exhibits high sensitivity, high transmittance, high resolving power and wide development latitude, is free from dye elution, deterioration by heat and deterioration by light, and has high productivity, since excellent polymerization can be achieved. The invention also provides a color filter prepared using the dye-containing curable composition, and a process of preparing the color filter.

Further, by using the dye-containing curable composition of the present invention, it is possible to provide a method of preparing a color filter in a simple manner and at high cost performances.

What is claimed is:

1. A dye-containing curable composition comprising an alkali-soluble binder and an organic-solvent-soluble dye represented by the following formula (I):

$$\text{Dye} \cdot nX \qquad (I)$$

wherein Dye represents an acid dye; X represents an amine compound having a polymerizable group; and n satisfies $0 < n \leq 10$.

2. A color filter comprising the dye-containing curable composition according to claim 1.

3. A process of preparing a color filter, comprising the steps of applying the dye-containing curable composition according to claim 1 on a substrate, exposing the composition to light through a mask, and conducting development to form a pattern.

4. The dye-containing curable composition according to claim 1, wherein the amine compound has a molecular weight of 700 or less.

* * * * *